(12) United States Patent
Berman

(10) Patent No.: US 7,390,191 B2
(45) Date of Patent: Jun. 24, 2008

(54) COMPUTER SYSTEM CONFIGURED TO SEQUENCE MULTI-DAY TRAINING UTILIZING A DATABASE

(75) Inventor: Dennis R. Berman, Irving, TX (US)

(73) Assignee: DRB LIT Ltd., Irving, TX (US)

( * ) Notice: Subject to any disclaimer, the term of this patent is extended or adjusted under 35 U.S.C. 154(b) by 87 days.

(21) Appl. No.: 11/055,186

(22) Filed: Feb. 9, 2005

(65) Prior Publication Data

US 2005/0233292 A1    Oct. 20, 2005

Related U.S. Application Data

(63) Continuation of application No. 10/815,341, filed on Mar. 31, 2004, now Pat. No. 7,364,432.

(51) Int. Cl.
G09B 7/00    (2006.01)
G09B 3/00    (2006.01)

(52) U.S. Cl. ................ 434/323; 434/322; 434/353

(58) Field of Classification Search ................ 434/118, 434/323, 350, 362, 353
See application file for complete search history.

(56) References Cited

U.S. PATENT DOCUMENTS

| | | |
|---|---|---|
| 3,408,749 A | 11/1968 | Brudner |
| 3,566,482 A | 3/1971 | Morchand |
| 3,606,688 A | 9/1971 | Zawels et al. |
| 3,671,668 A | 6/1972 | Reiffel |
| 3,715,811 A | 2/1973 | Thompson et al. ........... 434/310 |
| 4,055,907 A | 11/1977 | Henson ...................... 434/308 |
| 4,289,313 A | 9/1981 | Delamontagne ............ 273/256 |
| 4,416,454 A | 11/1983 | Delamontagne ............ 273/243 |
| 4,690,645 A | 9/1987 | Ukisu ......................... 434/309 |
| 4,817,036 A | 3/1989 | Millett et al. ............... 364/900 |
| 4,833,610 A | 5/1989 | Zamora et al. ............. 364/419 |
| 4,891,011 A | 1/1990 | Cook .......................... 434/157 |
| 4,895,518 A | 1/1990 | Arnold et al. ............... 434/118 |

(Continued)

FOREIGN PATENT DOCUMENTS

EP    1008975 A2    6/2000

(Continued)

OTHER PUBLICATIONS

Crowder, Norman A., Arithmetic of Computers. An Introduction to Binary and Octal Mathematics. A Tutor Text, 1958, pp. i-iv and 1-18, Doubleday & Company, Garden City, NY.

(Continued)

*Primary Examiner*—Ronald Laneau
*Assistant Examiner*—Benjamin W Lee
(74) *Attorney, Agent, or Firm*—Park, Vaughan & Fleming LLP

(57) ABSTRACT

A computer system configured to provide multi-day training to users. The computer system includes a program storage device. The program storage device includes a database that stores a number-of training-days value and sequence data. The program storage device also includes computer readable instructions, that when executed by the computer system, utilize the number-of-training-days value and the sequence data to control the sequence of training events.

27 Claims, 24 Drawing Sheets

U.S. PATENT DOCUMENTS

Figure 1A:
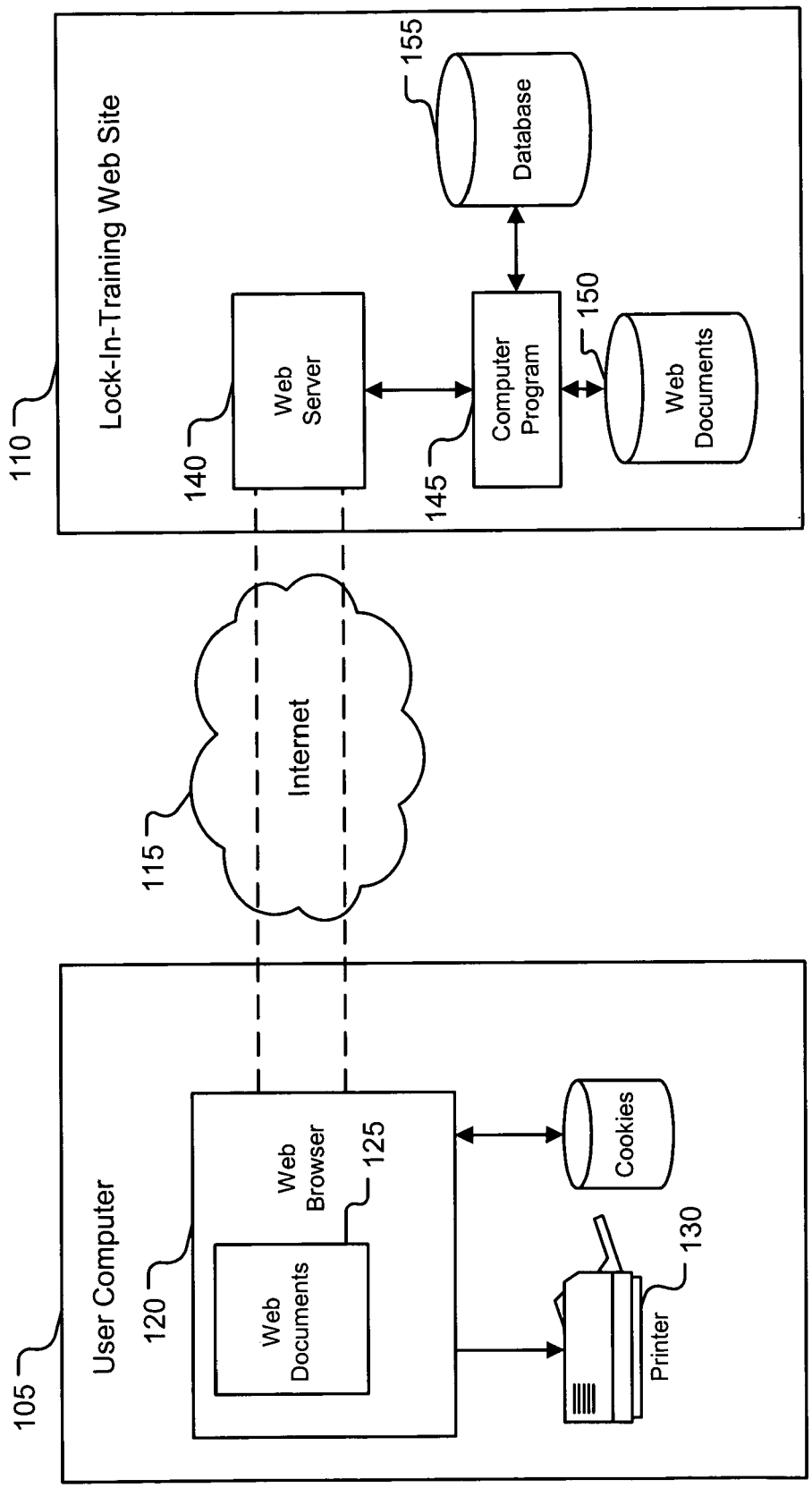

| | | | |
|---|---|---|---|
| 4,958,284 A | 9/1990 | Bishop et al. | 364/419 |
| 5,002,491 A | 3/1991 | Abrahamson et al. | 434/322 |
| 5,002,865 A | 3/1991 | Kumashiro et al. | 430/558 |
| 5,011,413 A | 4/1991 | Ferris et al. | 434/358 |
| 5,033,969 A | 7/1991 | Kamimura | 434/322 |
| 5,112,064 A | 5/1992 | Weedman | 273/429 |
| 5,141,439 A | 8/1992 | Cousins | 434/178 |
| 5,168,565 A | 12/1992 | Morita | 395/600 |
| 5,246,375 A | 9/1993 | Goede | 434/236 |
| 5,265,065 A | 11/1993 | Turtle | 395/600 |
| 5,267,865 A | 12/1993 | Lee et al. | 434/360 |
| 5,307,266 A | 4/1994 | Hayashi et al. | 364/419.07 |
| 5,310,349 A | 5/1994 | Daniels et al. | 434/350 |
| 5,314,340 A | 5/1994 | Gaddis | 434/327 |
| 5,325,465 A | 6/1994 | Hung et al. | 395/63 |
| 5,384,703 A | 1/1995 | Withgott et al. | 364/419.19 |
| 5,424,947 A | 6/1995 | Nagao et al. | 364/419.08 |
| 5,441,415 A | 8/1995 | Lee et al. | 434/350 |
| 5,442,780 A | 8/1995 | Takanashi et al. | 395/600 |
| 5,463,773 A | 10/1995 | Sakakibara et al. | 395/600 |
| 5,475,588 A | 12/1995 | Schabes et al. | 364/419.08 |
| 5,511,793 A | 4/1996 | Watt | 273/260 |
| 5,519,608 A | 5/1996 | Kupiec | 364/419.08 |
| 5,528,491 A | 6/1996 | Kuno et al. | 364/419.08 |
| 5,540,589 A | 7/1996 | Waters | 434/156 |
| 5,597,312 A | 1/1997 | Bloom et al. | 434/362 |
| 5,616,033 A | 4/1997 | Kerwin | 434/118 |
| 5,632,624 A | 5/1997 | Cameron et al. | 434/322 |
| 5,689,716 A | 11/1997 | Chen | 395/761 |
| 5,692,906 A | 12/1997 | Corder | 434/156 |
| 5,694,523 A | 12/1997 | Wical | 395/12 |
| 5,696,962 A | 12/1997 | Kupiec | 395/604 |
| 5,708,822 A | 1/1998 | Wical | 395/751 |
| 5,727,950 A | 3/1998 | Cook et al. | 434/350 |
| 5,749,736 A | 5/1998 | Griswold et al. | 434/322 |
| 5,768,580 A | 6/1998 | Wical | 395/613 |
| 5,788,508 A | 8/1998 | Lee et al. | 434/350 |
| 5,810,605 A | 9/1998 | Siefert | 434/362 |
| 5,823,788 A | 10/1998 | Lemelson et al. | 434/350 |
| 5,863,208 A | 1/1999 | Ho et al. | 434/362 |
| 5,885,087 A | 3/1999 | Thomas | 434/323 |
| 5,957,699 A | 9/1999 | Peterson et al. | 434/350 |
| 5,978,648 A | 11/1999 | George et al. | 434/362 |
| 5,987,302 A | 11/1999 | Driscoll et al. | 434/353 |
| 5,987,443 A | 11/1999 | Nichols et al. | 706/11 |
| 6,022,221 A | 2/2000 | Boon | 434/156 |
| 6,024,577 A | 2/2000 | Wadahama et al. | 434/322 |
| 6,029,043 A | 2/2000 | Ho et al. | 434/322 |
| 6,067,538 A | 5/2000 | Zorba et al. | 706/47 |
| 6,077,085 A | 6/2000 | Parry et al. | 434/322 |
| 6,086,382 A | 7/2000 | Thomas | 434/323 |
| 6,112,049 A | 8/2000 | Sonnenfeld | 434/350 |
| 6,115,683 A | 9/2000 | Burstein et al. | 704/1 |
| 6,120,297 A | 9/2000 | Morse, III et al. | 434/169 |
| 6,125,358 A | 9/2000 | Hubbell et al. | 706/11 |
| 6,146,148 A | 11/2000 | Stuppy | 434/322 |
| 6,148,174 A | 11/2000 | Remschel | 434/350 |
| 6,149,438 A | 11/2000 | Richard et al. | 434/322 |
| 6,149,441 A | 11/2000 | Pellegrino et al. | 434/350 |
| 6,155,834 A | 12/2000 | New, III | 434/118 |
| 6,160,987 A | 12/2000 | Ho et al. | 434/350 |
| 6,164,974 A | 12/2000 | Carlile et al. | 434/322 |
| 6,168,440 B1 | 1/2001 | Clark et al. | 434/322 |
| 6,173,251 B1 | 1/2001 | Ito et al. | 704/7 |
| 6,181,909 B1 | 1/2001 | Burstein et al. | 434/353 |
| 6,186,795 B1 | 2/2001 | Wilson | 434/236 |
| 6,199,034 B1 | 3/2001 | Wical | 704/9 |
| 6,208,832 B1 | 3/2001 | Remschel | 434/350 |
| 6,226,611 B1 | 5/2001 | Neumeyer et al. | 704/246 |
| 6,254,395 B1 | 7/2001 | Breland et al. | 434/156 |
| 6,256,399 B1 | 7/2001 | Poor | 382/100 |
| 6,267,601 B1 | 7/2001 | Jongsma et al. | 434/323 |
| 6,282,404 B1 | 8/2001 | Linton | 434/350 |
| 6,287,123 B1 | 9/2001 | O'Brien | 434/118 |
| 6,288,753 B1 | 9/2001 | DeNicola et al. | 348/586 |
| 6,292,792 B1 | 9/2001 | Baffes et al. | 706/45 |
| 6,295,439 B1 | 9/2001 | Bejar et al. | 434/350 |
| 6,302,698 B1 | 10/2001 | Ziv-El | 434/323 |
| 6,311,040 B1 | 10/2001 | Kucinski et al. | 434/350 |
| 6,343,935 B1 | 2/2002 | Clements | 434/156 |
| 6,345,270 B1 | 2/2002 | Tanaka | 707/4 |
| 6,356,864 B1 | 3/2002 | Foltz et al. | 704/1 |
| 6,411,924 B1 | 6/2002 | de Hita et al. | 704/9 |
| 6,461,166 B1 | 10/2002 | Berman | 434/323 |
| 6,470,170 B1 | 10/2002 | Chen et al. | 434/350 |
| 6,493,690 B2 | 12/2002 | Bertrand et al. | 706/45 |
| 6,526,257 B2 | 2/2003 | Doi et al. | 434/350 |
| 6,526,258 B2 | 2/2003 | Bejar et al. | 434/350 |
| 6,551,109 B1 | 4/2003 | Rudmik | 434/322 |
| 6,553,382 B2 | 4/2003 | Hatori | 707/102 |
| 6,554,618 B1 | 4/2003 | Lockwood | 434/322 |
| 6,584,470 B2 | 6/2003 | Veale | 707/102 |
| 6,585,520 B1 | 7/2003 | Berman | 434/236 |
| 6,636,241 B1 | 10/2003 | Aming | 715/762 |
| 6,662,365 B1 * | 12/2003 | Sullivan et al. | 725/25 |
| 6,755,661 B2 | 6/2004 | Sugimoto | 434/322 |
| 6,755,662 B2 * | 6/2004 | Fujino et al. | 434/322 |
| 6,769,917 B2 | 8/2004 | Fujino et al. | 434/322 |
| 6,890,181 B2 | 5/2005 | Warneke et al. | 434/167 |
| 6,898,411 B2 | 5/2005 | Ziv-El et al. | 434/350 |
| 6,978,115 B2 | 12/2005 | Whitehurst et al. | 434/350 |
| 7,074,128 B2 | 7/2006 | Berman | 434/430 |
| 2001/0036619 A1 | 11/2001 | Kerwin | 434/118 |
| 2001/0053513 A1 | 12/2001 | Corn et al. | 434/350 |
| 2003/0027122 A1 | 2/2003 | Stansvik | 434/323 |
| 2003/0031996 A1 | 2/2003 | Robinson | 434/350 |
| 2003/0049592 A1 | 3/2003 | Park | 434/322 |
| 2003/0077559 A1 | 4/2003 | Braunberger et al. | 434/322 |
| 2004/0002049 A1 * | 1/2004 | Beavers et al. | 434/350 |
| 2004/0009462 A1 * | 1/2004 | McElwrath | 434/350 |
| 2005/0003336 A1 | 1/2005 | Berman | 434/322 |

FOREIGN PATENT DOCUMENTS

WO    WO 02/056278    7/2002

OTHER PUBLICATIONS

Spaced repetition. [online], [retrieved on Apr. 26, 2005]. Retrieved from the Internet <URL: http://en.wikipedia.org/wiki/Spaced_repetition>.

Calinski. FullRecall. [online] [retrieved on Apr. 25, 2005]. Retrieved from the Internet <URL: http://www.fullrecall.com>.

Super Memory. [online], [retrieved on Apr. 25, 2005]. Retrieved from the Internet <URL: http://www.supermemo.com>.

U.S. Appl. No. 09/429,682, filed Oct. 1999, Kerwin, Patrick A.

Jefferson Lab [online], Science Vocabulary Hangman, Apr. 2001. Retrieved from the Internet <URL: http://education.jlab.org/vocabhangman/>.

Kidscom.com [online], Hangman, [retrieved on Jul. 26, 2007]. Retrieved from the Internet <URL: http://www.kidscom.com/games/hangman/hangman.html>.

Wikipedia [online], Hangman, [retrieved on Jul. 26, 2007]. Retrieved from the Internet <URL: http://en.wikipedia.org/wiki/hangman_game/>.

Memorize-It, Jun. 21, 2003 [online], [retrieved on Nov. 13, 2007]. Retrieved from the Internet Archive Wayback Machine using Internet <URL:http://web.archive.org/web/*/http://www.side8.com/memorize.html>.

* cited by examiner

| TRIVAC | Learn Fast; Learn for Good with the Lock-In Training (LIT) Learning Method |

WELCOME TO LIT

Before you proceed, you will need to register, which involves giving us some contact information as well as changing your password.

Student Name: John Smith
User Name: jsmith

E-mail Address: [ ]

Phone Number [ ]

Address: [ ]

City: [ ]  State: [ ]  Zipcode: [ ]

[ Press "Enter" to Continue ]

200

*Figure 2*

TRIVAC  Learn Fast; Learn for Good with the Lock-In Training (LIT) Learning Method

WELCOME TO LIT

Student Name: John Smith
User Name: jsmith
E-mail Address: jsmith@trivac.com
Phone Number 650-123-4567
Address: 123 University Drive
City: Palo Alto
State: CA
Zipcode: 94301

You must now change your password.
Enter your new password below.

New Password:

Confirm Password:

Press "Enter" to Continue

*Figure 3*

| TRIVAC | Learn Fast; Learn for Good with the Lock-In Training (LIT) Learning Method |
|---|---|

WELCOME TO LIT
WHY LIT WORKS

1. It is common knowledge that we learn and retain information through "repetition".

2. Repetition is not always easy or practical. "LIT MAKES IT EASY AND PRACTICAL".

3. Many times searching though masses of data to find the key information to learn is time consuming and inconsistent. LIT makes it faster and less stressful because the key information has already been extracted so that you only practice the "essence".

4. Many experts believe spaced repetition locks-in information, which can eventually become a habit. LIT PROVIDES SPACED REPETITION WHICH HELPS CREATE RETENTION OF INFORMATION AND BEGINS BUILDING HABITS.

5. Studying and learning can be laborious, tedious, and stressful. LIT does not require studying. Learning through LIT takes much less time than studying to achieve mastering and retaining information. When using the LIT Method, just type in the key words. If you do not remember the key words, then use the "hint" button as often as you like until you learn the answer.

6. LIT is taken over 3 days to achieve major benefits. The first day takes the longest. You will be amazed how well you know the information when completed. And best of all, when you are finished, you should know all of the key information without studying. This information should help you become more successful and productive.

Press "Enter" to Continue

500

*Figure 5*

| TRIVAC | Learn Fast; Learn for Good with the Lock-In Training (LIT) Learning Method |
|---|---|

Select a Training Session
Presidents of the United States

| Session Name | No. Parts | No. Questions | Completion | Status |
|---|---|---|---|---|
| Presidents of the United States before the Civil War | 1 | 16 | Day 0 of 3 | 🔒 |
| Presidents of the United States after the Civil War | 3 | 27 | Day 0 of 3 | 🔒 |

🔓 Unlocked / Available    🔒 Locked / Unavailable    ⏱ Completed

Return to Main Menu

700

*Figure 7*

TRIVAC — Learn Fast; Learn for Good with the Lock-In Training (LIT) Learning Method Presidents of the United States
before the Civil War -- Session 1

Question 1

Part 1 of 1
Question 1 of 16
Introductory Round

Question: Who was the first President?

Answer: The first President was George Washington.

Please read the question and the answer thoroughly,
focusing on the keyword(s) hilighted in blue.

[ Press "Enter" to Continue ]

Return to Main Menu

800

*Figure 8*

| TRIVAC | Learn Fast; Learn for Good with the Lock-In Training (LIT) Learning Method |
|---|---|

Presidents of the United States
before the Civil War -- Session 1

Part 1 of 1
Question 1 of 16
Introductory Round

Question 1

Question: Who was the first President?

Answer: The first President was George Washington.

Answer: The _____ President was _____.

Please type the correct keyword(s) in the space(s) above.

Return to Main Menu

900

*Figure 9*

| TRIVAC | Learn Fast; Learn for Good with the Lock-In Training (LIT) Learning Method |

Presidents of the United States
before the Civil War -- Session 1     Question 1

Part 1 of 1
Question 1 of 16
Introductory Round

Question: Who was the first President?

Answer: The first President was George Washington.

Answer: The first President was _____ .

Please type the correct keyword(s) in the space(s) above.

Return to Main Menu

1000

*Figure 10*

| TRIVAC | Learn Fast; Learn for Good with the Lock-In Training (LIT) Learning Method |
|---|---|
| Presidents of the United States before the Civil War -- Session 1 | Question 1 |

Part 1 of 1
Question 1 of 16
Introductory Round

Question: Who was the first President?

Answer: The first President was George Washington.

Answer: The first President was f _____ .

Check the spelling, letter, or number.

Return to Main Menu

*Figure 11*

TRIVAC     Learn Fast; Learn for Good with the Lock-In Training (LIT) Learning Method Presidents of the United States     Question 1
before the Civil War -- Session 1

Part 1 of 1
Question 1 of 16
Introductory Round

Question: Who was the first President?

Answer: The first President was George Washington.

Answer: The <u>first</u> President was <u>George Washington</u>.

You have correctly typed the answer.

| Press "Enter" to Continue |

Return to Main Menu

1200

*Figure 12*

TRIVAC     Learn Fast; Learn for Good with the Lock-In Training (LIT) Learning Method Presidents of the United States     Question 1
before the Civil War -- Session 1

Part 1 of 1
Question 1 of 16
Introductory Round

Question: Who was the first President?

Answer: The f___ President was G___ W_____.      Hint Used

[Hint] ← Click on "Hint" if needed.

Please type in the correct keyword(s) to complete the answer, or click the "Hint" button if you need help with the answer.

Return to Main Menu

1400

*Figure 14*

| TRIVAC | Learn Fast; Learn for Good with the Lock-In Training (LIT) Learning Method |

Presidents of the United States
before the Civil War -- Session 1

Part 1 of 1
Question 1 of 16
Introductory Round

Question 1

Question: Who was the first President?

Answer: The f_rst President was G_rg_ W_sh_ngt_n.    Hint Used

[Hint] ← Click on "Hint" if needed.

> Please type in the correct keyword(s) to complete the answer, or click the "Hint" button if you need help with the answer.

Return to Main Menu

1500

*Figure 15*

TRIVAC  Learn Fast; Learn for Good with the Lock-In Training (LIT) Learning Method Presidents of the United States
before the Civil War -- Session 1

Part 1 of 1
Retention Round 1

Question 1   ① ②

Question: Who was the first President?

Answer: The _____ President was _____.

[Hint] ← Click on "Hint" if needed.

Please type in the correct keyword(s) to complete the answer, or click the "Hint" button if you need help with the answer.

Return to Main Menu

1810 → ① 2 3 4 5 6 7 8 9 10 11 12 13 14 15 16

○ has not been answered without a hint    ⊕ answered once without a hint    ● answered twice without a hint

1800

*Figure 18*

TRIVAC  Learn Fast; Learn for Good with the Lock-In Training (LIT) Learning Method Presidents of the United States
before the Civil War -- Session 1   Question 1

Part 1 of 1
Question 1 of 16

Question: Who was the first President?

Answer: The first President was George Washington.

Please read the question
focusing on the keyword(s) hilighted in blue.

Press "Enter" to Continue

2100

*Figure 21*

COMPUTER SYSTEM CONFIGURED TO SEQUENCE MULTI-DAY TRAINING UTILIZING A DATABASE

This application is a continuation of U.S. patent application Ser. No. 10/815,341, entitled "METHODS OF SELECTING LOCK-IN TRAINING COURSES AND SESSIONS" by inventor Dennis R. Berman, which was filed on Mar. 31, 2004 now U.S. Pat. No. 7,364,432.

1. FIELD OF THE INVENTION

This invention relates to a system and method for a memory building and retention process and, more particularly, to a method and system for helping a user to learn, memorize, and retain unfamiliar materials.

2. BACKGROUND

Learning is an ongoing process in life that requires continuous memorization and retention of new concepts, ideas, terms, names, etc. Although a variety of methods have been developed for building memory, it is a constant search for finding an effective and faster way for enhancing people's memorization process for their daily uses.

Learning by reading and/or by classroom instruction has been the conventional learning method for centuries. A provided learning material may contain sufficient explanatory contents to help a learner to understand and memorize the subject matter. However, purely reading the learning material and/or receiving classroom instruction related to the material is not the best way to quickly memorize the new concepts contained because a huge portion of the learning material is used not for helping the learner to memorize the concepts, but for helping the learner to understand the concepts. Therefore, the learner may be distracted in her learning process to grasp the gist of the learning material. It is thus not uncommon that although, in a learning process, the concept may have to be explained in detail paragraph after paragraph, the gist of the concept may only hinge on a few keywords. Consequently, to learn or to memorize the new concept depends on how well a learner can memorize the keywords. Therefore, a learning platform designed to help the learner to quickly grasp and master the new concepts extracted from the learning material will significantly speed up the learning process.

Further, in the context of training, after the learners are expected to have memorized concepts conveyed in the learning material, it is very difficult to benchmark how much of the learning material the learners have actually mastered. For example, a multiple-choice test may be designed and given to the learners to check how well the learners have learned. However, it is well known that it is a common practice for the learner to guess the answer when she encounters a subject that she knows very little about during a multiple-choice exam. She might lack the knowledge to answer the question, but she may be lucky to get the answer right. Further, she may also get some of the answers right just because the answer is clearly shown in the provided choices and she is hinted. As such, the value of the multiple-choice exam is only good to a certain extent. When it is required that the learners must know all the material being taught, or a testing authority must be assured that certain concepts in the learning material must be mastered by the learner, the multiple choice test is obviously not the best choice.

What is needed, therefore, is a method and system for learning and retaining unfamiliar materials for short- and long-term immediate recall.

3. SUMMARY OF THE INVENTION

One embodiment of the invention is a Lock-In Training system. The system can include an appropriately programmed Web site and a user computer. The Lock-In Training system can also include an appropriately programmed stand-alone computer. Some embodiments of the invention allow student users to efficiently learn materials by taking Lock-In Training courses. A Lock-In Training course may include one or more Lock-In Training sessions. These sessions may include one or more Lock-In Training parts. These parts can include a group of questions and answers. The answers can include one or more keywords. A student user can lock-in material by entering keywords in response to questions. The questions may be presented in Introductory rounds and/or Retention rounds on one or more training days.

Other embodiments of the invention include the computer programs and databases that enable student users to take efficient training courses as well as the methods performed by the computer systems during the training courses.

4. BRIEF DESCRIPTION OF THE FIGURES

FIG. 1A presents a block diagram illustrating the primary components of a system that operates in accordance with some embodiments of the present invention.

Figure 1B:
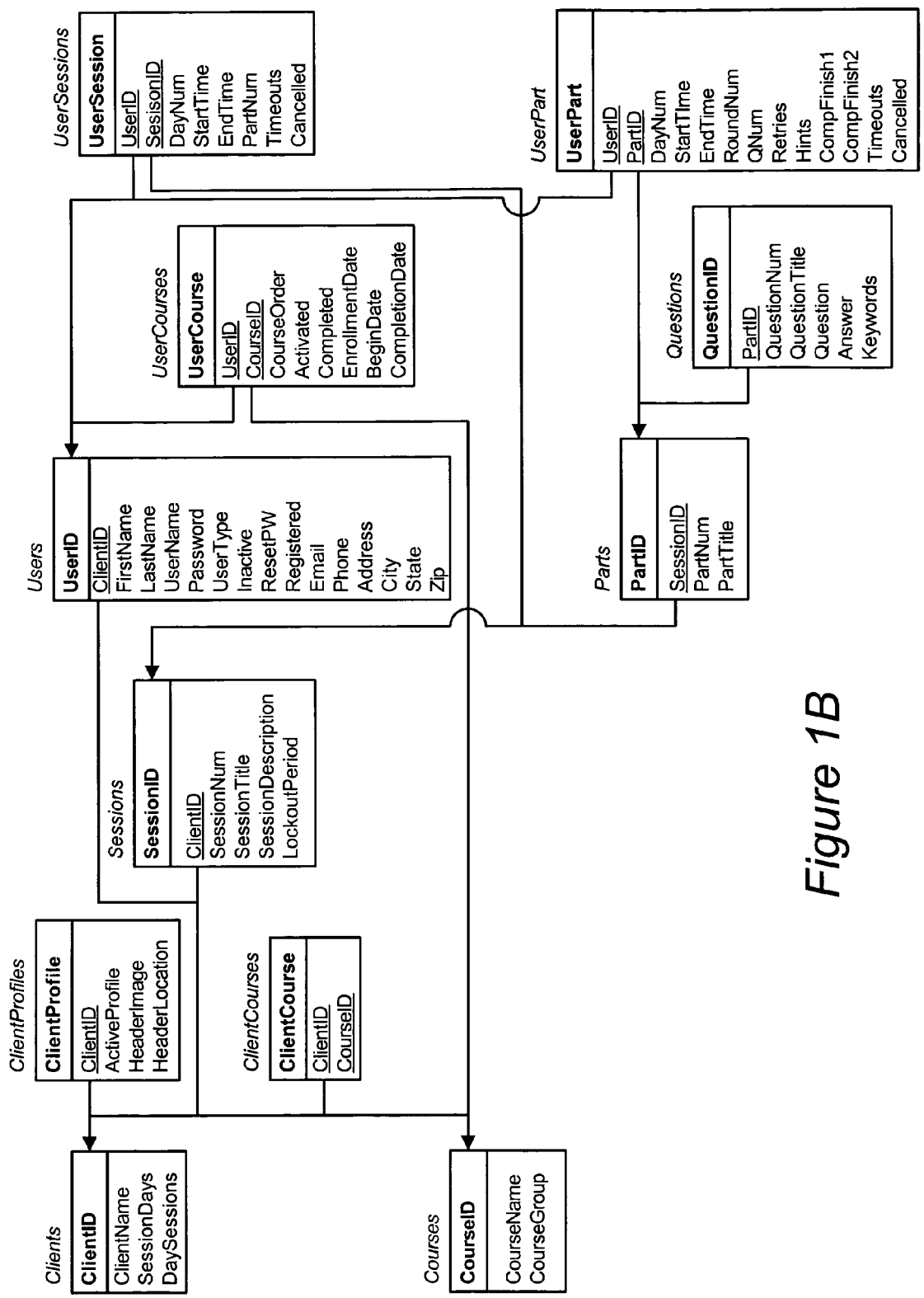

FIG. 1B presents a database.

FIG. 2 presents a registration screen display.

FIG. 3 presents another registration screen display.

Figure 4:
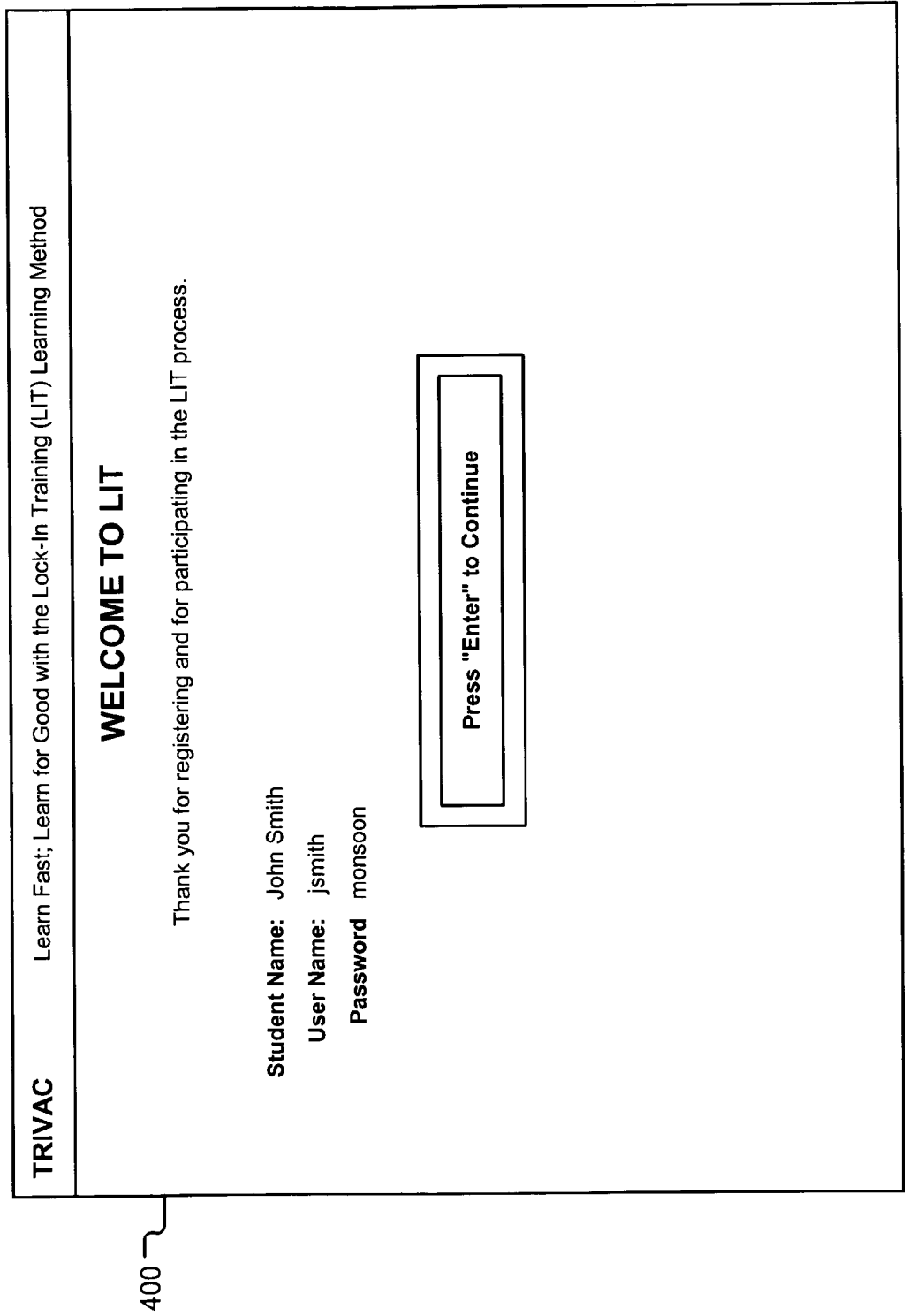

FIG. 4 presents yet another registration screen display.

FIG. 5 presents still another registration screen display.

Figure 6:

FIG. 6 presents a screen display that allows a student user to select a Lock-In Training course.

FIG. 7 presents a screen display that allows a student user to select a Lock-In Training session.

FIGS. 8 through 16 present screen displays from an Introductory round of a Lock-In Training course.

Figure 17:
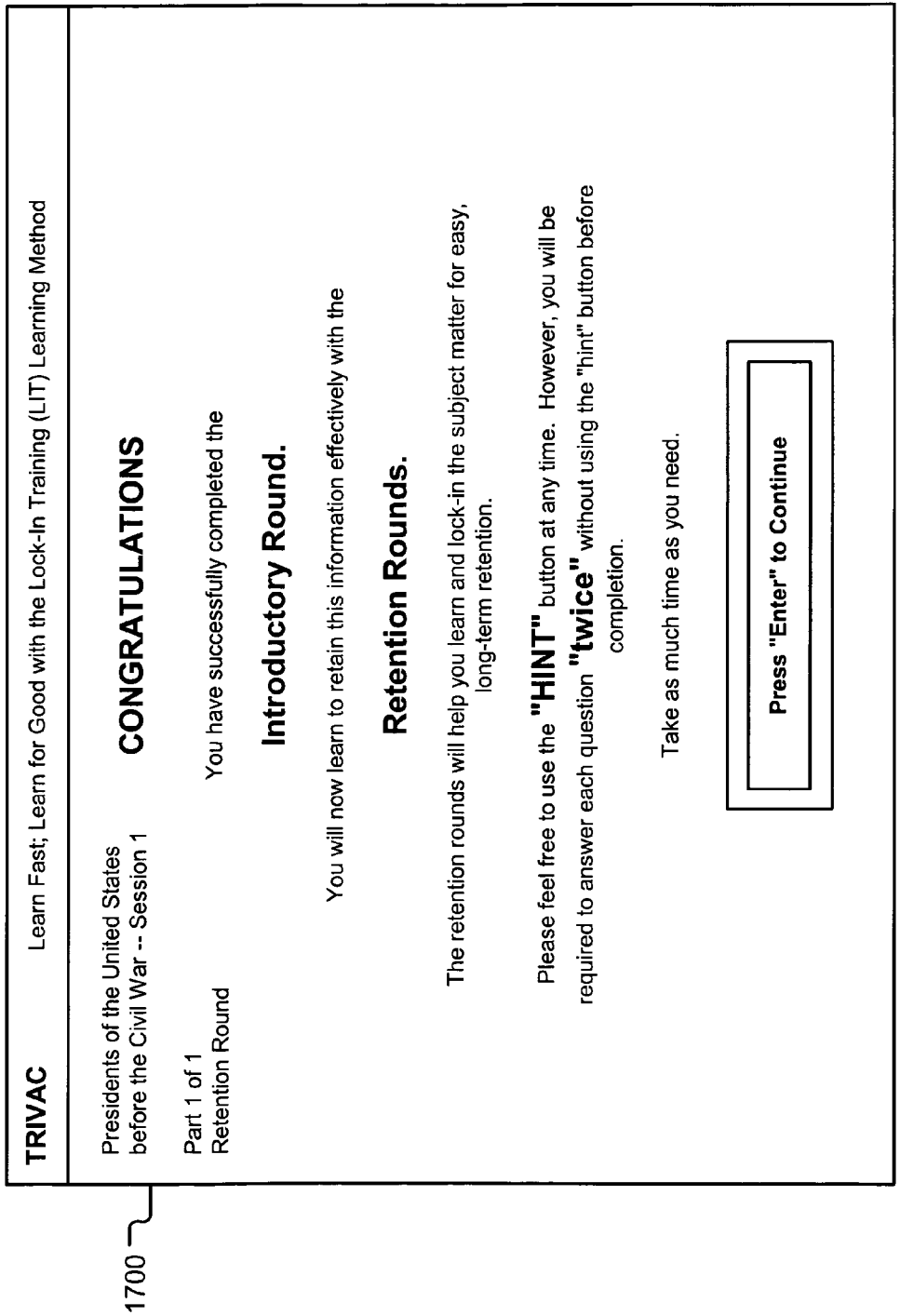

FIG. 17 presents a screen that informs a student that the student user has completed an Introductory round of a Lock-In Training course.

FIGS. 18 through 22 present screen displays from a Retention round of a Lock-In Training course.

Figure 23:
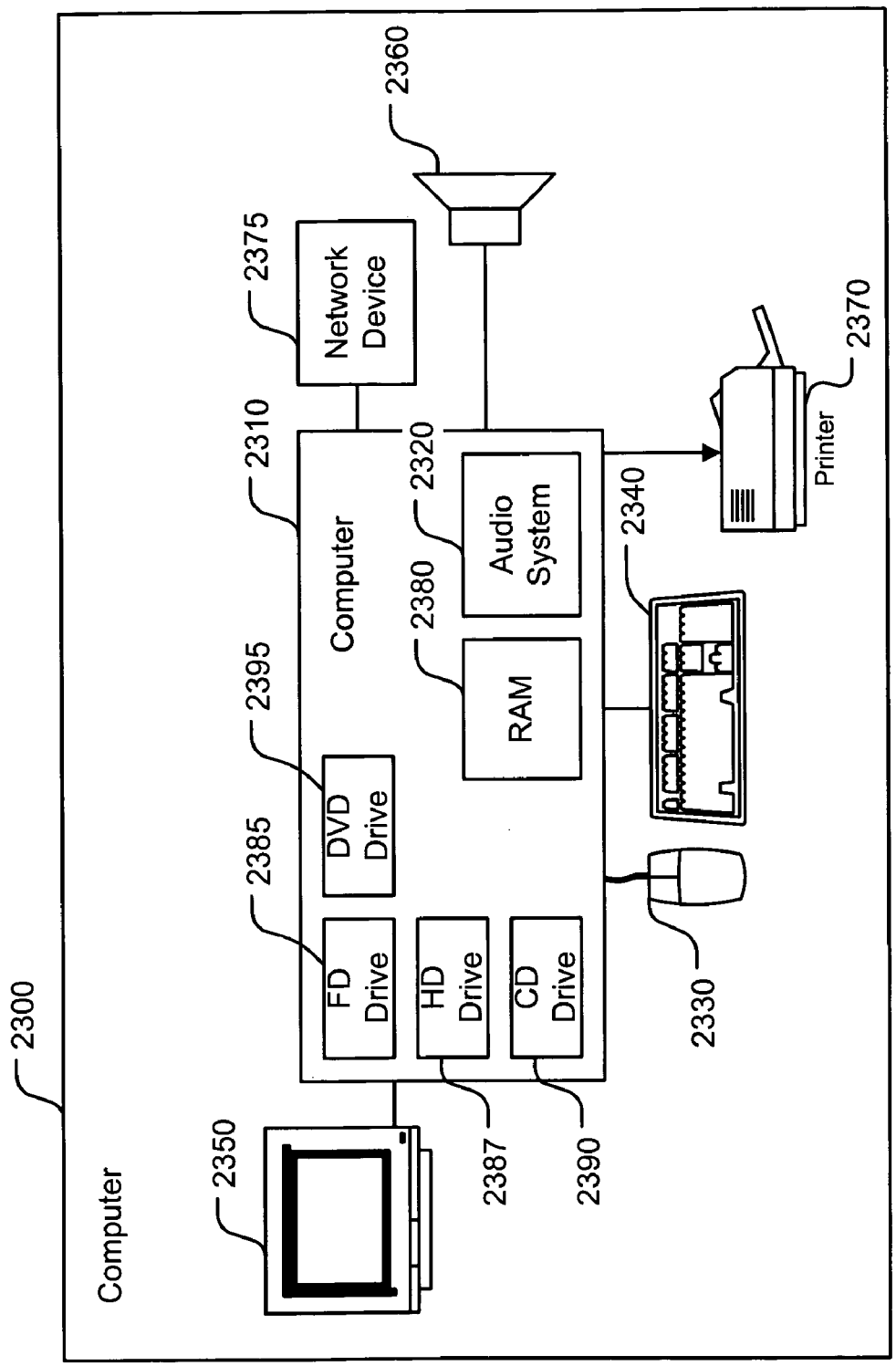

FIG. 23 presents a block diagram illustrating the primary components of a system that operates in accordance with some embodiments of the present invention.

5. DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

5.1 Glossary of Terms and Acronyms

The following terms and acronyms are used throughout the detailed description:

ASP (Active Serve Page). An HTML page that includes one or more small embedded programs, known as scripts, which are processed on a Web server before the HTML page is served to a Web browser. Typically, the Web server utilizes data from a database to build the HTML page before serving the HTML page to the Web browser.

Cookies. A technology that enables a Web server to retrieve information from a consumer's computer that reveals prior browsing activities of the consumer. The informational item stored on the consumer's computer (typically on the hard drive) is commonly referred to as a "cookie." Many standard Web browsers support the use of cookies.

Database. A collection of information organized in such a way that a computer program can store, and/or retrieve desired pieces of information.

Dynamic HTML. HTML extensions that enable a Web document to react to user input without sending requests to a Web server.

Element. In markup languages such as HTML, the combination of a set of tags, any content contained between the tags, and any attributes the tags may have. One example of an element is an object.

Foreign key. A column or combination of columns whose values match the primary key of some other table. See (Primary key and Database).

HTML (Hypertext Markup Language). A standard coding convention and set of codes for attaching presentation and linking attributes to informational content within documents. During a document authoring stage, the HTML codes (referred to as "tags") are embedded within the informational content of the document. When the Web document (or HTML document) is subsequently transferred from a Web server to a Web browser, the codes are interpreted by the Web browser and used to parse and display the document. Additionally, in specifying how the Web browser is to display the document, HTML tags can be used to create hyperlinks to other Web documents. For more information on HTML, see Ian S. Graham, The HTML Source Book, John Wiley and Sons, Inc., 1995 (ISBN 0471-11894-4).

HTTP (Hypertext Transport Protocol). The standard World Wide Web client-server protocol used for the exchange of information (such as HTML documents and client requests for such documents) between a Web browser and a Web server. HTTP includes a number of different types of messages that can be sent from the client to the server to request different types of server actions. For example, a "GET" message, which has the format GET <URL>, causes the server to return the document or file located at the specified URL.

Hyperlink. A navigational link from one document to another, or from one portion (or component) of a document to another. Typically, a hyperlink is displayed as a highlighted word or phrase that can be selected by clicking on it using a mouse to jump to the associated document or portion.

Hypertext System. A computer-based informational system in which documents (and possibly other types of data entities) are linked together via hyperlinks to form a consumer navigable "web."

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations that may be made in the future, including changes and additions to existing standard protocols.)

Intranet. A network belonging to an organization, usually a corporation, accessible only by the organization's members, employees, or others with authorization. An intranet's Web sites look and act just like any other Web sites, but a firewall surrounding an intranet fends off unauthorized users.

JavaScript. A scripting language developed by Netscape that enables Web authors to design interactive Web sites. See Dynamic HTML above.

Object. Any item that can be individually selected and/or manipulated. An object can include hyperlinks, shapes and pictures that appear on a display screen, as well as less tangible software entities.

Primary Key. In databases, the column or combination of columns that serve(s) as the unique identifier of a specific row in a database table.

URL (Uniform Resource Locator). A unique address which fully specifies the location of a file or other resource on the Internet. The general format of a URL is "protocol://machine address:port/path/filename." The port specification is optional, and if the consumer specifies none, the Web browser defaults to the standard port for the protocol. For example, if HTTP is specified as the protocol, the Web browser will use the HTTP default port of 80.

Web Site. A computer system that serves informational content over a network using the standard protocols of the World Wide Web. Typically, a Web site corresponds to a particular Internet or Intranet domain name, such as "www.trivac.com," and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services.

World Wide Web ("Web"). Used to refer generally to both (i) a distributed collection of interlinked, viewable hypertext documents (commonly referred to as Web documents or Web pages) that are accessible via the Internet, and (ii) the client and server software components that provide consumer access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols that may be used in place of (or in addition to) HTML and HTTP.

5.2 System Components

FIG. 1A illustrates a simplified block diagram of a user computer 105 and a Lock-In Training Web site 110, both of which are linked together by the Internet 115 or an Intranet (not shown). Those skilled in the art will appreciate that the block diagram of FIG. 1A is simplified to illustrate only those functional elements of interest in describing the present invention.

5.3 User Computer

The user computer 105 is conventional. The user computer 105 may be any type of computing device that allows a consumer to interactively browse Web sites on the World Wide Web via a Web browser. For example, the user computer 105 may be a personal computer (PC) that runs a Windows operating system, an Apple computer, that runs an Apple operating system, a Web appliance, a hand held computer, or even a telephone. The user computer 105 typically includes a Web browser 120, such as Microsoft's Internet Explorer, which uses the HTTP protocol to communicate with Web servers. As is well known, the Web browser 120 can request, receive, and display Web documents 125 as well as other data entities, such as audio, video, and/or image documents. If printing of Web documents or other documents is desired, then the user computer 105 may also include a printer 130.

5.4 Lock-In Training Web Site

Generally, the Lock-In Training Web site 110 provides functionality for allowing users to learn, memorize, and retain unfamiliar materials. More specifically, the Lock-In Training Web site 110 includes a Web server 140 that allows a user to retrieve a plurality of Web documents 150. The Lock-In Training Web site also contains a computer program 145 that posts a series of Web documents 150, such as HTML documents and/or Dynamic HTML documents. In some embodiments of the invention, the Lock-In Training Web site generates HTML documents and Dynamic HTML documents from ASP documents and one or more databases, such as database 155. The Lock-In Training Web site 110 is a web site that allows users to enter and receive data as will be discussed more fully below. The computer program 145 and the database 155 can be stored in program storage devices such as hard disk drives, floppy disk drives, flash memory, DVD disks, CDROM disks, etc.

5.5 Courses, Sessions, Parts, and Rounds

Generally, the Lock-In Training Web site allows a number of users to take Lock-In Training courses. A Lock-In Training course typically relates to a general subject area. For example, a course may relate to the Presidents of the United States. Such a course can include one or more Lock-In Training sessions, which often relate to more specific subject areas. For example, a course related to the Presidents of the United States could include a first session related to the Presidents before the Civil War and a second session related to the Presidents after the Civil War.

A Lock-In Training session may include one or more parts. A part typically includes a group of "questions" and "answers." For example, a question may be "Who was the first President?" Similarly, an answer may be "The first President was George Washington." Each answer can include one or more keywords, i.e., significant words within the answer that may be utilized to convey the answer. The keywords in the above answer are "first" and "George Washington."

When a student user utilizes the Lock-In Training Web site, the user can be introduced to the material to be learned in an Introductory round. In the Introductory round, a student user typically reviews questions and answers, re-types the answers, and then answers the question with or without hints.

After the student user completes the Introductory round, the student user can take one or more Retention rounds. The purpose of the Retention rounds is to lock-in the material into the user's long-term memory. In a Retention round, the student user typically answers the questions with or without hints. As will be discussed below, in order to complete the Retention rounds, the student user must successfully answer the questions according to pre-defined criteria.

5.6 Lock-In Training Web Site Database

As shown in FIG. 1A, the Lock-In Training Web site 110 can include a database 155. This database 155 can contain a number of tables. One example of database 155 is shown in FIG. 1B. In FIG. 1B, the table names are italicized. In addition, the table primary keys are bolded and the table foreign keys are underlined. As discussed, in Section 5.1, a primary key provides a unique identifier of a specific row in a database table. Similarly, a foreign key is a database column whose value matches the primary key of another table.

One table in the database shown in FIG. 1B is the "Clients" table. This table can be utilized to store information about Lock-In Training clients. Typical clients may include employers, training institutions, elementary schools, middle schools, high schools, colleges, government agencies, and military branches, among others. The "Clients" table shown in FIG. 1B contains a primary key, "ClientID." The "Clients" table contains three columns. The first column, "ClientName," can store the name of a client, such as "IBM," "Starbucks," "Palo Alto School System," etc. The second column, "SessionDays," can store the number of days of training that a student must take to fully complete a Lock-In Training session or course. For example, a session that includes three days of training could have "SessionDays" set to three. Alternatively, a session that takes four days to complete could have "SessionDays" set to four. Lower values of "SessionDays" require less student time, while higher values of "SessionDays" ensure higher retention of learned materials. Depending upon client preferences, a client can specify, via "SessionDays," the desired number of training days for courses or sessions taken by the client's students. The third column, "DaySessions," can be used to control the training sequence of several multi-day sessions. For example, a Lock-In Training course may include three sessions, such as sessions A, B and C, each of which are taken over a number of days. For such a course, a "DaySessions" value of two could indicate that a student must complete the first training day of sessions A and B before taking the second training day of either session A or session B. However, the student could take the first training day of session C before taking any training days of either session A or B. On the other hand, if the "Day Sessions" value was three, then the student could not take the second training day of sessions A, B, or C until the student has completed the first training day of sessions A, B, and C. Similarly, if the "Day Sessions" value was zero, then a student could take all of the training days of session A before taking any days of sessions B or C.

Another table in the database shown in FIG. 1B is the "Courses" table. This table is utilized to store information about Lock-In Training courses. The table contains a primary key "CourseID" and two columns. The first column, "CourseName," can store course names of a Lock-In Training course. Example course names include "Presidents of the United States," "Governors of the States," and "Largest Cities in Texas." The second column, "CourseGroup," can store course groupings. For example, the above three courses could be grouped by a client administrator or by a system administrator under "American History."

Yet another table in the database shown in FIG. 1B is the "ClientProfiles" table. The "ClientProfiles" table can be utilized to customize the graphical user interface of Lock-In Training courses for clients. The "ClientProfiles" table contains a primary key "ClientProfile" and four columns. The first column is a foreign key, "ClientID." The second column "ActiveProfile," can store data indicating whether a client has an active graphical user interface. For example, if a client desires a customized graphical user interface, then "ActiveProfile" could be set to "true." On the other hand, if a client does not desire to utilize a custom graphical user interface, then "ActiveProfile" could be set to "false." The third column, "HeaderImage," can store a file name that contains a customized image. This customized image can be utilized to create a portion of a customized graphical user interface, such as a custom header. The fourth column, "HeaderLocation," can store horizontal and vertical screen locations that can be utilized to position the customized image on the computer screen of the user computer 105. Other embodiments of the database include columns for other images, such as footer images, other image locations, background images, custom color schemes, custom fonts, custom font sizes, custom text, custom objects, and other graphical user interface elements.

Still another table in the database shown in FIG. 1B is the "ClientCourses" table. This table contains information related to Lock-In Training courses that are associated with a particular client. As shown in FIG. 1B, the "ClientCourses" table contains a primary key "ClientCourse" and two foreign keys: "ClientID" and "CourseID."

Another table in the database shown in FIG. 1B is the "Sessions" table. The "Sessions" table provides information about a Lock-In Training session. The "Sessions" table contains a primary key "SessionID." In addition, the table contains five columns. The first column is a foreign key, "ClientID." The second column "SessionNum," can store the number of a session. For example, the first, second, and third sessions of a Lock-In Training course could be indicated by "SessionNum" values of 1, 2, and 3. The third column "SessionTitle," can store titles of sessions. For example, a title of a session could be "Presidents of the United States before the Civil War." The fourth column "SessionDescription," can store descriptions of sessions. For example, a session description could be "The names of the sixteen Presidents of the United States before the Civil War." The fifth column "LockoutPeriod" can be utilized to inactivate sessions until a specified period of time has passed so that spaced repetition of training sessions can be assured. More specifically, "LockoutPeriod" can store the length of a time period that must transpire between portions of sessions. For example, "LockoutPeriod" could indicate the required time between the completion of a prior day's session and the beginning of a current day's session. Alternatively, "LockoutPeriod" could indicate the required time between the beginning of a prior day's session and the beginning of a current day's session. Thus, "LockoutPeriod" can be utilized to ensure that a student does not take portions of Lock-In Training sessions too rapidly. If such a time period has not transpired, then a session (or a course) can be inactivated so that the student cannot take the remaining portions of the sessions until the "LockoutPeriod" has transpired. As will be discussed below, long-term retention of materials can be increased if spaced repetitions of Lock-In Training sessions occur.

Still another table in the database shown in FIG. 1B is the "Users" table. This table can be utilized to store information on users of the Lock-In Training system. Typical users include private and public employees, elementary students, middle school students, high school students, college students, military personnel and law enforcement personnel. The "Users" table contains a primary key "UserID." In addition, the table contains fifteen columns. The first column is a foreign key, "ClientID." The second and third columns, "FirstName" and "LastName," can store the first and last names of a user. For example, FirstName could store "John" and "LastName" could store "Smith." Other embodiments of the database 155 could include an additional column for storing the middle name or the middle initial of users. The fourth and fifth columns "UserName" and "Password," can be utilized to rapidly login a user into the Lock-In Training system. For example, a user named John Smith could utilize "jsmith" and "Monsoonl$" to rapidly login into the Lock-In Training system. Other embodiments of the invention could also include other columns that contain information utilized to login a user into the Lock-In Training Website. For example, the table could contain columns holding user's biometric information, such as fingerprints, voice patterns, eye patterns, etc. The sixth column, "UserType," can be utilized to indicate whether the user is a student, a client administrator, a system administrator, or another type of user. Student users take Lock-In Training sessions. As discussed below, the rights and privileges of users can depend upon the user's UserType. Client administrators typically have the ability to configure Lock-In Training courses, add or remove student users, and assign Lock-In Training courses to student users. Similarly, system administrators typically have the ability to add or remove clients and some or all of the rights and privileges of client administrators. The seventh column, "Inactive," can be utilized to indicate inactive users, such as users that are no longer employed by a client. Such users may include, for example, users that have not accessed the Lock-In Training Web site for a predetermined period of time or users that have a "ClientID" associated with a delinquent client. The eighth and ninth columns of the "Users" table, "ResetPW" and "Registered," can be utilized to store user administrative data. For example, "ResetPW" can be utilized to indicate if the computer program 145, a client administrator, or a system administrator assigned the user's password or alternatively if the user has reset the user's password. Thus, if the user has reset the user's password, then "ResetPW" value could be set to "true;" otherwise, the "ResetPW" value could be set to "false." In addition, "Registered" can be utilized to indicate whether the user has registered with the Lock-In Training Web site 110. The remaining columns in the "Users" table can hold various information about the user, such as: the user's email, telephone number, street address, city, state, and zip code.

Still another table in the database shown in FIG. 1B is the "UserCourses" table. This table contains a primary key, "UserCourse," and eight columns. The first two columns are foreign keys: "UserID" and "CourseID." The third column, "CourseOrder," can be utilized to sequence courses for student users. For example, student users may have a number of different courses assigned to them, such as: American History I, American History II, and American History III. These three courses may be assigned "CourseOrder" values of one, two, and three respectively. Thus, the "CourseOrder" values could be utilized to ensure that the student takes American History I before American History II, or American History III. Alternatively, if the courses could be taken in any order, then "CourseOrder" for those courses could be set to zero. The fourth column in the "User Courses" table is "Activated." The "Activated" value can be utilized to indicate whether a particular course is available to a user. The fifth column in the "User Courses" table is "Completed." The "Completed" column can be utilized to indicate whether a user has previously completed a course. The final three columns can be utilized to store course enrollment dates, course start (begin) dates, and course completion dates.

Yet another table in the database shown in FIG. 1B is the "UserSessions" table. The "User Sessions" table can be utilized to store information regarding a user's training session activities. The "User Sessions" table contains a primary key "UserSession." In addition, the table contains eight columns, which include two foreign keys, "UserID" and "SessionID." The third column, "DayNum," can store information relating to the user's training activities. For example, if the user has completed a session's first day of training, then "DayNum" could be one. Similarly, if the user has completed a session's first and second days of training, then "DayNum" could be two. The next two columns, "StartTime" and "EndTime," could store the start and end times of a user's session activities. These columns could be utilized to determine if a user has complied with a session's "LockoutPeriod" requirement.

The seventh column, "Timeouts," could store the time period since the user has entered any information into the user computer 105, via computer keyboard, mouse, trackball, touch pad, touch screen, microphone, or otherwise. The final column, "Cancelled," could indicate that a user's session has been canceled because, for example, the user's "Timeouts" exceeded a predefined time period.

Another table in the database shown in FIG. 1B is the "Parts" table. This table can store information related to a Lock-In Training session's parts. This table contains a primary key "Part ID." In addition, the table contains three columns, one of which is a foreign key, "SessionID." The second column, "Part Num," can be utilized to sequence the parts within a session. For example, a Lock-In Training session may include a number of different parts, such as: "U.S. Presidents 1-8" and "U.S. Presidents 9-16." These parts may be assigned "Part Num" values of one and two respectively. Thus, the "Part Num" values could be utilized to ensure that the student user takes "U.S. Presidents 1-8" before "U.S. Presidents 9-16." Alternatively, if the parts can be taken in any order, then they both could be assigned a "Part Num" of zero. The final column in the Parts table, "Part Title," can be utilized to store the title of a part, such as "U.S. Presidents 1-8."

Still another table in the database shown in FIG. 1B is the "Questions" table. This table can store information related to questions and answers that will be presented to student users. The "Questions" table includes a primary key, "QuestionID." In addition, the table includes six columns. The first column is a foreign key, "Part ID." The next three columns can be utilized to store question numbers, question titles, and questions. Thus, question number 1 could have a title "The first President of the United States." Similarly, "Question" number 1 could be "Who is the first President of the United States?" The fifth column, "Answer," can be utilized to store the answers to questions. The "Answer" to "Question" number 1 could be "The first President of the United States was George Washington." The last column in the "Questions" table, "Keywords," can be used to store the keywords of a question. The keywords for the above "Answer" could be "first," "George," and "Washington." In some embodiments of the invention, the "Answer" includes one or more codes that indicate the keywords. For example, the "Answer" to "Question" number 1 could be "The %% first President of the United States was %% George %% Washington." In this embodiment of the invention, the "%%" characters could be utilized to indicate a keyword. In such embodiments of the invention, a separate "Keywords" column is not needed because the keywords are identified in the "Answer."

The last table in the database shown in FIG. 1B is the "UserPart" table. This table can be used to store information related to users' activities related to taking a Lock-In Training part. This information, combined with the information stored in the "UserSessions" table, can be utilized to allow student users to resume their training at the question, round, part, and session where they previously stopped training. The table includes a primary key, "UserPart," and thirteen columns. The first two columns, "UserID" and "Part ID," are foreign keys. The third column, "DayNum," can store information relating to the user's training day activities. For example, if the user has completed the first training day of a part, then "DayNum" could be one. Similarly, if the user has completed the first and second training days of a part, then "DayNum" could be two. The next two columns, "StartTime" and "EndTime," could be utilized to store the start and end times of a user's part training activities. These columns could also be utilized to determine if a user has complied with a session's "LockoutPeriod" requirement. The table's sixth column, "RoundNum," can store a student user's current round. For example, "RoundNum" could be zero if the student user is in an Introductory round. Similarly, "RoundNum" could be one if the student user is in a Retention round. In some embodiments of the invention, "RoundNum" could also indicate the number of "Retention" rounds that a user has taken. For example, if the student user has completed the first Retention round, then "RoundNum" would be one. Similarly, if the student user has completed the third Retention round, then "RoundNum" could be set to three. The seventh column, "QNum," can store a student user's current question number. "RoundNum" and "QNum" can be utilized to determine a student user's location in a particular Lock-In Training part so that the user can efficiently resume training at that location. The eighth column, "Retries," can store the number of times a student user retried each question in an Introductory round or a Retention round. Thus, "Retries" could be utilized to determine the relative difficulty levels of various questions. The ninth column, "Hints," can store the total number of times that a student user utilized a hint to answer a question in a round. The tenth column "CompFinish1," can store the Retention round number in which a student successfully answered a question without a hint in that round. Similarly, the eleventh column, "CompFinish2," can store the Retention round number in which a student user successfully answered each question a second time without a hint in that round. The twelfth column, "Timeouts," could store the time period since the user has entered any information into the user computer 105. The final column, "Cancelled," could indicate that a user's part has been canceled because, for example, the user's "Timeouts" exceeded a predefined time period.

Some embodiments of the computer program 145 may utilize multiple databases to store the above information, while other embodiments of the computer program 145 utilize only one database, such as the database 155 shown in FIG. 1B, to store such information.

5.7 Functions Performed by Lock-In Training Website

5.7.1 Logging in Users

One function that the Lock-In Training Web site 110 may perform is logging in users into the Lock-In Training Web site 110. For example, the Lock-In Training Web site's computer program 145 and Web Server 140 may serve a login Web document to a user computer 105. The login Web document may request a user to enter a username and a password. After the user enters a username and a password into the user computer 105, the user computer's Web browser 120 transmits the username and the password to the Lock-In Training Web site 110. After the Lock-In Training Web site 110 receives the username and password, the computer program 145 compares the username and password to data stored in a database. For example, the computer program 145 may compare the username and password to values in the "UserName" and "Password" columns of the Users table in the database shown in FIG. 1B. If the username and password are not found in the database, then the Lock-In Training Web site 110 may serve another login Web document to the user computer 105.

On the other hand, if the username and password are found in the database, then the computer program 145 may retrieve user information from the database, such as for example, "UserType," "FirstName," "LastName," "ResetPW," "Registered," "Email," "Phone," "Address," "City," "State," and "Zip" values from the "Users" table.

5.7.2 Registering Users

If the information retrieved from the database indicates that the user is not registered, then the computer program 145 may serve a Web document, such as Web document 200 shown in FIG. 2, to the user computer 105. Web document 200 allows a user to enter the user's e-mail address, phone number, street address, city, state and zip code. The information entered by the user is then typically stored in a database, such as for example in the "Users" table of the database shown in FIG. 1B. In addition, after the user has entered the above information, data would typically be stored in the database 155 indicating that the user has been registered.

In some embodiments of the invention, the graphical user interface of Web document 200 may be based upon data stored in a database. For example, if a user's "ClientID" is Starbucks, the "Client Profiles" table of the database of FIG. 1B may be accessed, using the Starbuck's "ClientID." As a result, the computer program 145 can retrieve one or more graphic images, image locations, background images, custom color schemes, custom fonts, custom font sizes, custom text, and/or other graphical user interface elements that are unique to Starbucks. Then, the graphical user interface of Web document 200, and optionally other Web documents, may include some or all of the retrieved graphical user interface element(s). Similarly, if the user's "ClientID" is IBM, then the graphical user interface of Web document 200 and following Web documents may include graphical user interface elements that are unique to IBM.

If the information retrieved from the database indicates that the user has not previously reset the user's password, then the computer program 145 and the web server 140 may serve a Web document, such as Web document 300 shown in FIG. 3, to the user computer 105. Web document 300 allows a user to enter and confirm a new password. If the two entered passwords match and optionally meet certain password criteria, such as password length, number of unique character sets in the password, password quality, etc., then the entered password can be stored in the database. In addition, data would typically be stored in the database that indicates that the user's password has been reset. Some embodiments of the invention store the password in plain text. However, other embodiments of the invention store the password in an encrypted format to increase the security of the password. As shown in FIG. 3, Web document 300 may also display previously entered user information. Some embodiments of the invention also allow the user to correct or update any displayed user information.

For the convenience of the user, some embodiments of the invention display a Web document, such as Web document 400 shown in FIG. 4, that displays the student name, username, and password. Using the printer 130 attached to user computer 105, this Web document may be printed and securely stored by the user.

In some embodiments of the invention, the computer program 145 and the web server 140 serve a Web document, such as Web document 500 shown in FIG. 5, that provides the user with a background and an overview of the Lock-In Training process. Similarly, in some embodiments of the invention, the computer program 145 and the web server 140 serve a Web document that displays the terms-of-use of the Lock-In Training Web site. In such embodiments of the invention, the user may be required to click on a button indicating that the user has read and agreed to the terms-of-use before the user is allowed to take any training courses. In some embodiments of the invention, the Web document that displays the terms-of-use also lists relevant patent numbers that cover various portions of the Lock-In Training Web site and other proprietary information.

5.7.3 Selecting Courses

Another function that the Lock-In Training Web site 110 may perform is selecting Lock-In Training courses. For example, the Lock-In Training Web site's computer program 145 and Web server 140 may serve a Web document, such as Web document 600 shown in FIG. 6, that allows a user to select a particular Lock-In Training course. The Web document may include a number of objects. For example, Web document 600 includes a "Presidents of the United States (2 Sessions, 43 Questions)" object that could be selected by a user to indicate that the user desires to take a Lock-In Training course relating to learning the Presidents of the United States. Similarly, Web document 600 includes "Governors of the States (3 Sessions, 50 questions)" and "Largest Cities in Texas (1 Session, 10 Questions)" objects.

In some embodiments of the invention, the list of Lock-In Training courses displayed in Web document 600 would be determined by retrieving information from a database. For example, the computer program 145 could retrieve the course names from the "User Courses" and "Courses" tables shown in the database of FIG. 1B. The retrieved courses could then be inserted into a Dynamic HTML Web document by the computer program 145, which would then be served to user computer 105.

Some embodiments of the invention also indicate to the user the status of Lock-In Training courses. For example, as shown in FIG. 6, if a user has previously completed a Lock-In Training course, as indicated in a "Completed" value in a "User Courses" table, then a check icon 610 could indicate the status of the course. Similarly, if a course is available, as indicated in an "Activated" value in the "User Courses" table, then an unlocked padlock icon 620 could indicate the status of the course. Likewise, if a course is unavailable, then a locked padlock icon 630 could indicate the status of the course. A course may be unavailable because a user has recently completed another course or another session. In some embodiments of the invention, the time that a user has completed a prior session or course is stored in the database. In addition, in some embodiments of the invention, the database stores a lockout period for each course and/or each session. If the time that has elapsed since the user completed a prior session or course is less than the lockout time, then a course may be unavailable.

In some embodiments of the invention only courses having a certain status would be included in the Web document that was served to the user. For example, some embodiments of the invention would only include available courses in Web documents. In other embodiments of the invention, which serve Web documents that include unavailable courses, if the user selects an unavailable course, then a Web document is served that includes an error message explaining that the course is not available and, optionally, the reason for the course's unavailability. Similarly, in some embodiments of the invention, if the user selects a completed course, then a Web document containing (a) a message explaining that the course has been completed and/or (b) a message asking if the user would like to review the course material.

5.7.4 Selecting Sessions

Another function performed by some embodiments of the invention is selecting a session. After the user has selected a Lock-In Training course, such as the "Presidents of the United States" course, the computer program 145 could retrieve course, session, part, and question information from database table(s). For example, the sessions of the course, the number of parts in each session, and the number of questions in the session could be retrieved. In addition, the number of training days that the user has completed for each session and the total number of training days for each session could be retrieved. Further, the status of the session (available, unavailable, or completed) may be retrieved. After retrieving the above information, the computer program 145 and the Web server 140 could serve a Web document, such as Web document 700 shown in FIG. 7, that allows the user to select a session. The Web document may include a number of objects. For example, Web document 700 includes a "Presidents of the United States before the Civil War" object and a "Presidents of the United States-after the Civil War" object. By clicking on one of the above objects, the user could select a Lock-In Training session. In addition to the two session objects, Web document 700 includes a "Return to Main Menu" object. If the user selects that object, then the Lock-In Training Web server 140 and computer program 145 could serve a Web document, such as Web document 600, that allows the user to select a Lock-In Training course.

Some embodiments of the invention also indicate to the user the status of Lock-In Training sessions. For example, if a user has previously completed a Lock-In Training session, then a check icon could indicate the status of the session. In addition, if a session is available, and hence unlocked, then an unlocked padlock could indicate the status of the session. Similarly, if a session is unavailable, then a locked padlock could indicate the status of the session.

A session may be unavailable because a user has recently completed another session or another course. In some embodiments of the invention, the time that a user has completed a prior session is stored in the database. In addition, in some embodiments of the invention, the database stores a session lockout period for each course and/or each session. If the time that has elapsed since the user completed a prior session is less than the session lockout time, such as 1, 2, 3, 4, 6, 8, 10, 12, 14, 16, 18, 20, 22, 24, 36, or 48 hours, then the session may be unavailable.

Similarly, in some embodiments of the invention, the number of sessions that a user has either begun or completed within a predetermined time period is stored in a database. If the number of sessions begun or completed within a predetermined time period, such as 1, 2, 3, 4, 6, 8, 10, 12, 14, 16, 18, 20, 22, 24, 36, or 48 hours, is greater than a predetermined number, such as 1, 2, 3, or 4, sessions, then new sessions may be unavailable to the user.

In some embodiments of the invention only sessions having a certain status would be included in the Web document that was served to the user. For example, some embodiments of the invention would only include available and completed sessions in Web documents. In some embodiments of the invention, which serve Web documents that include unavailable sessions, if the user selects an unavailable session, a Web document is served that includes an error message explaining that the session is not available and, optionally, the reason for the session's unavailability. For example, if a user has completed two sessions in the last 24 hours and the user selects another session, then a Web document may be served that includes an error explaining that the user must wait a day to take another session because the user has already completed two sessions in one day.

5.7.5 Introductory Round

After a user has selected a Lock-In Training session by clicking on a session object, the computer program 145 can query a database to determine if the user had previously completed a portion of the session. If the student user had previously partially completed a Lock-In Training session, then the computer program 145 may retrieve information that identifies the last part and the last round in which the student user answered a question. In addition, the computer program 145 may retrieve information identifying the last question that the student user answered. Then, using the retrieved information, the computer program 145 and the Web server 140 may serve a Web document that allows the user to continue the user's training session in the same part, round, and question that the student user utilized when the student user ceased training. Thus, for example, if a student user stopped a prior Lock-In Training session while working on a particular question in a particular part and round, then the student user could resume the session at that same question, part, and round.

On the other hand, if the student user had not previously completed a portion of a session, then the computer program 145 and the Web server 140 may serve an HTML Web document or a Dynamic HTML Web document, such as Web document 800 shown in FIG. 8, which allows the student user to begin the user's training session. As shown in FIG. 8, Web document 800 presents the student user with the current session title, "Presidents of the United States before the Civil War," and the current session number, "1." In addition, Web document 800 presents the user with the current and total number of parts and the current and total number of questions in the current part. Further, Web document 800 informs the user that the user is currently training in an "Introductory Round." As discussed in Section 5.5, the purpose of the introductory round is to introduce the user to the material that the user will be learning.

Web document 800 also includes one or more elements that present the user with a question: "Who was the first President?" Similarly, Web document 800 includes one or more elements that present the user with an answer: "The first President was George Washington." Notice that "first" and "George Washington" are displayed in a bold font in Web document 800. The bold font is utilized to indicate that "first," "George" and "Washington" are keywords. As discussed in Section 5.5, keywords indicate the essence of an answer. Thus, by learning the keywords of an answer, a user will have learned the answer. In some embodiments of the invention, Web document 800 identifies the keywords by using a different font color, a different font size, a different font style (bold, italic, underline, etc.), and/or a different font family (Times Roman, Arial, etc.) than are used for non-keywords in the answer. In some embodiments of the invention, Web document 800 identifies the keywords by placing a graphic object around or near the keywords, such as a box or an oval. To continue the Lock-In Training session, the user would typically select the "Press 'Enter' to Continue" object. Alternatively, the user could select the "Return to Main Menu" object to return to Web document 600.

If the user selects the "Press 'Enter' to Continue" object, then Web document 900 shown in FIG. 9 could be displayed on the computer display of the user computer 105. Web document 900 presents the first question and the complete first answer to the student user. However, Web document 900 also presents a partially completed first answer to the student user. In some embodiments of the invention, as shown in FIG. 9, the partially completed first answer replaces the keywords with continuous underlines. In other embodiments of the invention, the keywords are replaced with non-continuous underlines. Thus, "first" would be replaced with "_____." The advantage of utilizing non-continuous underlines is that the non-continuous underlines provide the user with a small hint: the number of characters in each keyword. Thus, a user seeing "_____" would understand that the keyword contains 5 characters. In some embodiments of the invention, non-continuous underlines are utilized only in the Introductory round, while continuous underlines or no underlines are utilized in the Retention rounds.

Next, the student user enters the keywords into the user computer 105 using the completed answer as a guide. In some embodiments of the invention, the student user types characters into a keyboard attached to user computer 105. In other embodiments of the invention, the user utilizes a mouse to select keys that are displayed on a simulated keyboard on a computer display. In still other embodiments of the invention, the student user utilizes a number pad to enter the key words. For example, a user may type "4" to enter "G." "44" to enter "H," and "444" to enter "I." The use of such keyboards to enter characters may be particularly useful when the user computer 105 is a telephone. In still other embodiments of the invention, the student user would enter the keyword via a tablet and handwriting recognition software and/or via a microphone and voice recognition software. Regardless of the method utilized to enter information, the student user would enter "first" into the user computer 105. FIG. 10 presents a Web document 1000 into which the user has entered "first." In some embodiments of the invention, Web document 1000 identifies the entered keywords by using a different font color, a different font size, a different font style (bold, italic, underline, etc.), and/or a different font family (Times Roman, Arial, etc.) than are used for non-keywords in the answer. In some embodiments of the invention (not shown), the Web document could identify the entered keywords by placing a graphic object, such as a box or an oval, near or around the keywords.

Next, the user would typically enter the keyword "George." However, if the user enters an incorrect character, such as "r" for the first character of the next keyword, then as shown in Web document 1100 in FIG. 11, the incorrect character "r" may be displayed by using a different font color, a different font size, a different font style (bold, italic, underline, etc.), and/or a different font family (Times Roman, Axial, etc.) than are used for correctly entered characters. For example, a Dynamic HTML Web document may display incorrectly entered characters in red, and may display correctly entered characters in blue. As shown in Web document 1100, the character "r" is displayed in an italic bold font while correctly entered characters are displayed in a regular bold font. In addition, as shown in Web document 1100, when the user has entered an incorrect character, the Dynamic HTML Web document could display an error message, such as "Check the spelling, letter, or number."

In some embodiments of the invention, only one incorrect character will be displayed. Thus, after a user types "Thomas" for the keyword "George," then the Web document would display "s_____" because only the last incorrectly entered character would be displayed. However, in other embodiments of the invention, 2, 3, 4, 5, or all incorrect characters could be displayed. Thus, if all incorrect characters were displayed, then after the user enters "Thomas" for the keyword "George," the Web document would display "Thomas."

In some embodiments of the invention, the Web document would display characters that are entered for a keyword in a predetermined combination of upper and lower case characters regardless of the case of the entered characters. For example, if a student user enters "GEORGE" for the keyword "George," then the Web document would display the entered characters as "George." Similarly, if the student user enters "Washington" for the keyword "Washington," then the Web document would display the entered characters as "Washington."

In other embodiments of the invention, when a user has correctly entered a character of a keyword, depressing the backspace and/or the delete keys does not remove the correctly entered characters. However, in other embodiments of the invention, depressing one or both of those keys would remove the correctly entered characters from the user computer's display.

In some embodiments of the invention, the student user is required to enter a space between key words. Thus, the student user would be required to enter a space between "George" and "Washington." However, in other embodiments of the invention, the student user would not be required to enter a space. Thus, in such embodiments of the invention, the student user could enter "georgewashington" and the Web document would display "George Washington." Similarly, a student user may not be required to enter a space between "first" and "george" in Web document 1100.

In some embodiments of the invention, a student user can "jump" between keywords. For example, if a user desires to type "first" and then "Washington," but not "George," then the student user could type "first[Tab][Tab]Washington." The [Tab] characters would allow the student user to skip over the second keyword. Similarly, after typing "first" the student user could utilize the mouse to select the first character in the third keyword. Allowing a student user to enter the information that the user knows and then using that information to enter the remaining keywords can increase the long-term retention of the student user.

After a user has correctly entered all the keywords in an answer, then, as shown in Web document 1200 in FIG. 12, the Dynamic HTML Web document may display a message indicating that the user has correctly entered the keywords. In some embodiments of the invention, after a user has correctly answered a question, a database in the Lock-In Training Website 110 is updated to indicate the successful answer, together with the current part, round, and session. In other embodiments of the invention, this information is stored on a cookie on the user computer 105. This information, regardless of whether it is stored on the Lock-In Training Web site 110 or the user computer 105, can be utilized to allow the student user to easily resume training at a later time.

As shown in FIG. 12, after the successful answer of a question, a "Press 'Enter' to Continue" object is displayed. This object allows the student user to continue the student user's training. A student user would typically then select the "Press 'Enter' to Continue" object.

Figure 13:

After the user selects the "Press 'Enter' to Continue" object, a Web document, such as Web document 1300 shown in FIG. 13, could be displayed. Note that Web document 1300 displays the first question and an incomplete first answer. Web document 1300 does not include a complete answer as did Web document 1200. Instead, Web document 1300 includes a "Hint" object.

The "Hint" object provides the user with one or more hints to enable the user to easily enter the keywords. For example, in some embodiments of the invention, such as shown in FIG. 14, if the user selects the "Hint" object a single time, the Web document would display the first character in each keyword. In some embodiments of the invention, such as shown in FIG. 15, if the user selects the "Hint" object a second time, the Web document would display the first character in each keyword and the consonants in each keyword. Similarly, if the user selects the "Hint" object a third time, the Web document would display all the keywords.

The above description includes three hints: the first letter of each keyword, the consonants of each keyword, and the complete keywords. Other embodiments of the invention may include fewer or more hints. Such hints could include:

1) First character in the xth keyword, where x increases with each selection of the "Hint" object;

2) Consonants in the xth keyword, where x increases with each selection of the "Hint" object;

3) Complete xth keyword, where x increases with each selection of the "Hint" object;

4) Vowels in all keywords;

5) Vowels in the xth keyword, where x increases with each selection of the "Hint" object;

6) First xth letters in one or more keywords, where x increases with each selection of the "Hint" object;

7) Every xth keyword, where x is 2, 3, 4, 5 or 6;

8) Complete or partial image hints, where the image is associated with one or more keywords (For example, an image of George Washington would be associated with the keywords "George Washington");

9) Complete or partial sound hints, where the sound is associated with one or more keywords (For example, an audio segment "Fourscore and seven years ago" played via the user's computer speakers would be associated with the keywords "Abraham Lincoln");

10) Replacing no underlining of keywords or continuous underlining of keywords with non-continuous underlines; and 11) Replacing no underlining of keywords with continuous underlining of keywords.

Some embodiments of the invention would automatically display one of the above hints if the student user enters a certain number of incorrect characters. For example, if a student user enters 1, 2, 3, 4, 5, 6, 7, 8, or 9 incorrect characters, then the Web document will display a hint. Similarly, if the student user enters 2, 3, 4, 5, 6, 7, 8 or 9 incorrect characters, then the Web document will display another of the above hints.

Some embodiments of the invention continue to display prior hints when successive hints are displayed. However, other embodiments of the invention display only a limited number of prior hints, such as 1, 2, 3, or 4 prior hints. In still other embodiments of the invention, no prior hints are displayed. In addition, in some embodiments of the invention, the order of hints can vary. Thus, in such embodiments of the invention, selecting the "Hint" object of a particular question will not always display the same hint. In still other embodiments of the invention, the order of hints for particular questions is stored in a database. Thus, hints may be optimized for particular questions. For example, the order of hints could be stored in a "Questions" table in the database shown in FIG. 1B.

Figure 16:
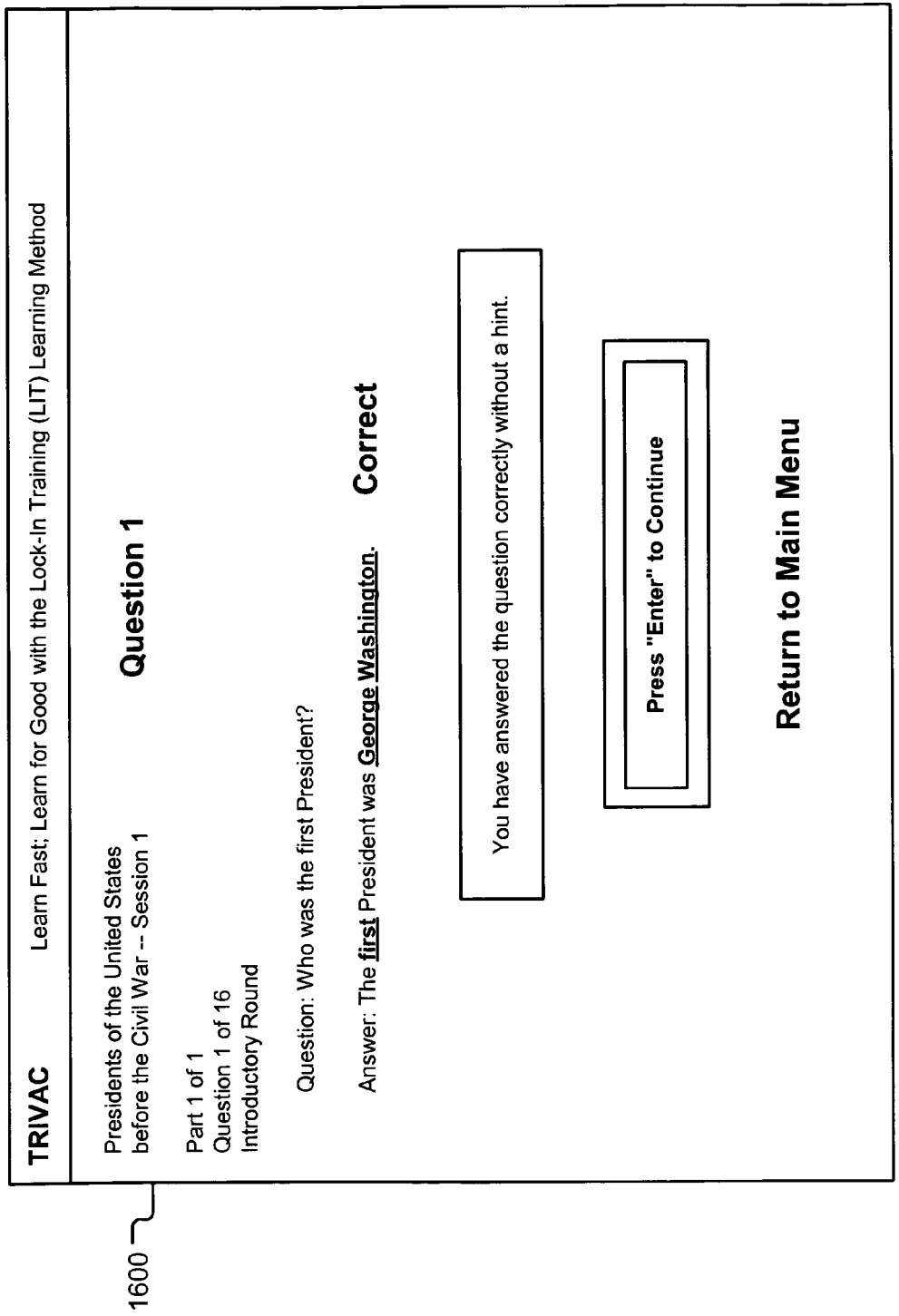

In some embodiments of the invention, the user cannot advance to other questions unless the user has correctly entered the keywords in the answer to a current question without using any hints. In other embodiments of the invention, the user cannot advance unless the user has correctly typed in the keywords using less than 2, 3, 4, or 5 hints. In still other embodiments of the invention, the user cannot advance unless the user has correctly typed in the keywords x times without using any hints, where x is 1, 2, 3, 4, or 5. As shown in FIG. 16, after a student user has correctly entered the keywords without using a hint, whether requested by selecting a hint object or automatically generated because of incorrect entries, Web document 1600 displays an indication that the student user has correctly answered the question. In addition, Web document 1600 displays a "Press 'Enter' to Continue" object.

In some embodiments of the invention, when a student user selects the "Press 'Enter' to Continue" object, the student user advances to a second question in the Introductory round. Thus, Web documents similar to Web documents 800 through 1600 will be displayed for the second question. In some embodiments of the invention, the information required to generate the Web documents for a second question, such as "Questions" table information, will have been downloaded to the user computer 105 before the user selects the "Press 'Enter' to Continue" object of FIG. 16. Thus, the responsiveness of the training system will be optimized. After the student user has correctly answered the second question the required number of times with less than the required number of hints, then, similar Web documents for the remaining questions in the part will be displayed. After the user has completed all the questions in the part, then the student user will have completed the Introductory round for that part. If the Lock-In Training session contains another part, then Web documents similar to Web documents 800 through 1600 will be displayed for the questions in the other part(s). After the user has completed all the questions in all the parts, then the student user will have completed the Introductory round.

5.7.6 Retention Round

After the student user has completed the Introductory round, then the student user may continue to the Retention rounds. While the purpose of the Introductory round was to introduce the material to the student users, the purpose of the Retention rounds is to lock-in the material into the student user's long-term memory. In some embodiments of the invention, a retention round begins by the computer program 145 and the Web server 140 serving a Web document, such as Web document 1700 shown in FIG. 17. Web document 1700 informs the student user that the user has completed the Introductory round and has begun the Retention rounds. In addition, Web document 1700 provides the student user with the requirements to complete the Retention rounds. In some embodiments of the invention, the completion requirements are obtained from a database. For example, as shown in FIG. 17, the completion requirements may be answering each question twice without using the hint button. Thus, if a student user utilizes a hint for a question in a Retention round, then that question will be included in a future Retention round. On the other hand, if a student user has answered a question twice without using a hint, then that question will not be included in future Retention rounds. The student user will continue taking Retention rounds until each question has been answered twice without using any hints. In other embodiments of the invention, the requirements of completing the Retention rounds may be answering each question a different number of times, such as 1, 3, 4, or 5, without using any hints. Similarly, in other embodiments of the invention, the requirements of completing the Retention rounds may be answering each question a predetermined number of times using less than a predetermined number of hints, such as 1, 2, 3, 4, or 5.

After a student user has reviewed Web document 1700, then the user would typically select the "Press 'Enter' to Continue" object. Then, the computer program 145 can query a database to determine if the user had previously completed a portion of a Retention round. If the user had previously completed a portion of a Retention round, then the computer program 145 may retrieve information that identifies the location that the student user stopped training. Then, using the retrieved information, the computer program 145 and the Web server 140 may serve a Web document that allows the user to continue the user's training session. Thus, for example, if a user stopped a prior session while working on a particular question in a particular Retention round on a particular day of training, then the user could begin the session at that same question, round, and training day.

On the other hand, if the user had not previously completed a portion of a Retention round, then the computer program 145 and the Web server 140 may serve a Web document, such as Web document 1800 shown in FIG. 18, which allows the user to begin the user's Retention rounds. As shown in FIG. 18, Web document 1800 includes an element that presents the user with the current session title, "Presidents of the United States before the Civil War," and the current session number, "1." In addition, Web document 1800 presents the user with the current and total number of parts. Further, Web document 1800 informs the user that the user is currently in a "Retention Round." Web document 1800 also includes a "Hint" object. The "Hint" object provides the student user with one or more hints, as did the "Hint" in the Introductory round.

Unlike the Web documents utilized in the Introductory round, Web document 1800 includes a dynamic process bar 1810. The dynamic process bar 1810 can indicate the completion status of the Retention rounds. For example, the Retention rounds' completion criteria may be to answer each question two times without the use of a hint. For such a completion criteria, a dynamic process bar could indicate that (1) a question has not been answered without a hint, (2) a question has been answered once without a hint, and (3) a question has been answered twice without a hint. Similarly, if the Retention rounds' completion criteria is to answer each question three times without the use of a hint, then a dynamic process bar could indicate that (1) a question has not been answered without a hint, (2) a question has been answered once without a hint, (3) a question has been answered twice without a hint, and (4) a question has been answered three times without a hint.

Referring to FIG. 18, the dynamic process bar 1810 includes sixteen different circles. Each circle has a number directly above the circle that corresponds to a question number. Thus, the circle with "1" above it corresponds to question one. The pattern within the circle corresponds to the status of the question. As shown on the bottom left of FIG. 18, a circle pattern with lower-left to upper-right lines indicates that a question "has not been answered without a hint." Similarly, as shown on the bottom center of FIG. 18, a circle pattern with horizontal and vertical lines indicates that a question has been "answered once without a hint." Likewise, as shown on the bottom right of FIG. 18, a circle pattern with diagonal crossing lines indicates that a question has been "answered twice without a hint." Thus, because all of the circles in the dynamic process bar 1810 have patterns with lower-left to upper-right lines, the dynamic process bar indicates that none of the sixteen questions have been answered without a hint. The dynamic process bar 1810 can also indicate the current question number. For example, the disk that surrounds circle "1," indicates that the current question is question one.

Figure 19:

FIG. 19 presents a Web document 1900 with another dynamic process bar 1910. This dynamic process bar 1910 indicates that questions one through six have been "answered twice without a hint." The dynamic process bar 1910 also indicates that questions seven through ten have been "answered once without a hint" and that questions eleven through sixteen have "not been answered without a hint." In addition, the dynamic process bar 1910 indicates that the current question is question "10."

While the dynamic process bars of FIGS. 18 and 19 utilize different patterns within circles to indicate question status, other graphical elements could be utilized. For example, different colors of solid circles or circle sizes could indicate question status. Similarly, different graphical shapes, such as rectangles, squares, quadrilaterals, triangles, or ellipses, could be utilized to indicate question status. Similarly, text within a graphical shape could be utilized to indicate question status. For example, a circle surrounding a "1" could indicate that the question has been answered once without a hint and a circle surrounding a "2" could indicate that the question has been answered twice without a hint.

Web document 1900 includes two confirmation images 1920 and 1930. These confirmation images 1920 and 1930 could correspond to a Retention round completion requirement of answering a question correctly twice without using a hint. Confirmation image 1920 indicates that the student user has answered the current question once without using a hint. The confirmation image 1930 indicates that the student user still needs to answer the question without using a hint one additional time.

Figure 20:
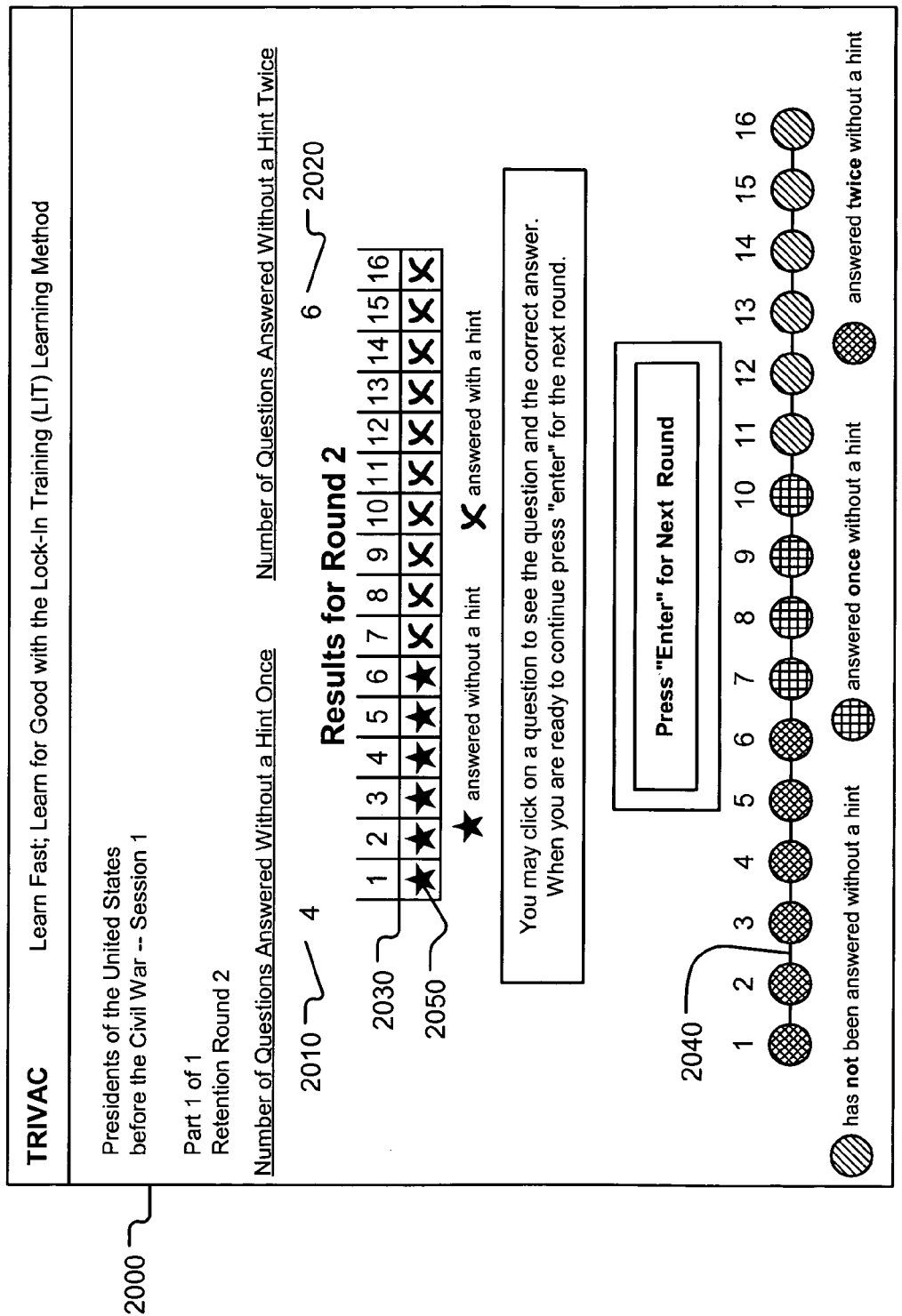

After a student user has completed a Retention round in which the user utilized a hint to answer a question, a Web document, such as Web document 2000 shown in FIG. 20, allows the student user to review the student user's progress toward completing the Retention rounds. For example, the Retention rounds' completion criteria may be to answer each question two times without the use of a hint. Thus, element 2010 provides the student user with the number of questions that have been answered once without a hint. Similarly, element 2020 provides student users with the number of questions that the student user has answered twice without a hint.

Web document 2000 also allows the student to review the student's progress in the last Retention round. As shown in FIG. 20, Web document 2000 contains a "Results for Round 2" chart 2030. This chart 2030 contains an entry for each question answered in the last Retention round. The chart 2030 contains an entry for sixteen questions. Thus, the last Retention round included sixteen questions. The chart 2030 also contains a question status indicator for each question. A star indicates that a question was answered without a hint and an "X" indicates that a question was answered with a hint. As shown in FIG. 20, Web document 2000 also contains a dynamic progress bar 2040.

In some embodiments of the invention, a student user may review questions by selecting either the question number or the question status indicator in the chart 2030. Thus, for example, if a user selects the star 2050 with a mouse, for example, then a Web document, such as Web document 2100 shown in FIG. 21, could be displayed on the user computer 105. Web document 2100 allows the student user to spend time learning the answer to question one before beginning Retention round 3. After the student user has completed reviewing question one, then the user can redisplay Web document 2000 by selecting the "Press 'Enter' to Continue" object of Web document 2100. If the student user desires to review additional questions, then the user may select other question status indicators. When the student user has reviewed the desired questions, and is ready to take the next Retention round, then the student user could select the "Press 'Enter' for Next Round" object. Then, the student user could answer the remaining questions (with or without hints).

Figure 22:
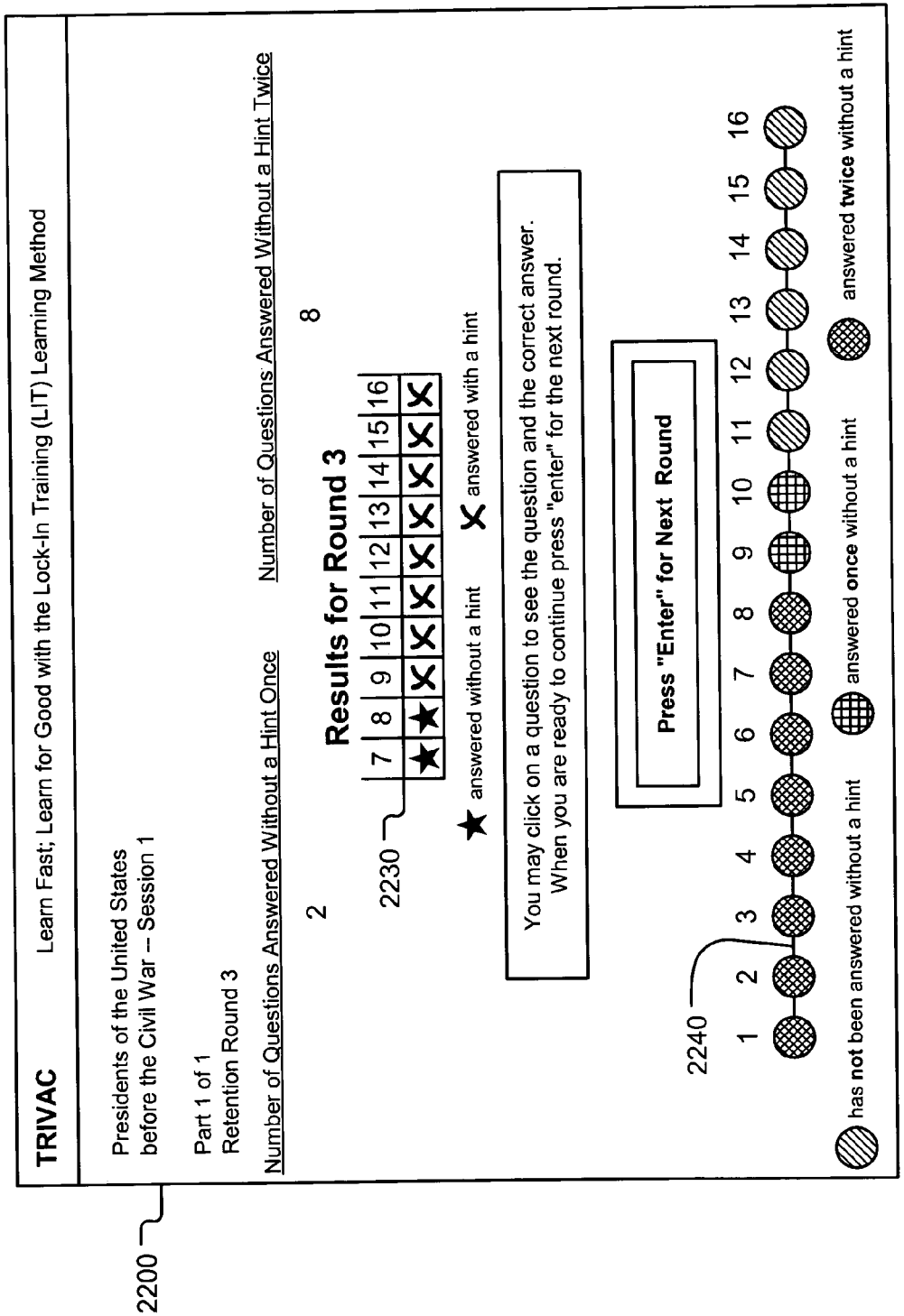

After the student user has completed the third Retention round, then, in some embodiments of the invention, the student user can review the student user's progress in that round by reviewing a Web document, such as Web document 2200 shown in FIG. 22. This Web document indicates that two questions have been answered without a hint once and that eight questions have been answered without a hint twice.

Note that chart 2230 only includes question numbers and question status indicators for questions seven through sixteen. Questions one through six are not included in the chart 2230 because the prior Retention round did not require the student user to answer those questions as those questions had already been answered twice without hints in the first two Retention rounds. The chart 2230 indicates that the student user answered questions seven and eight without a hint in the last round. Thus, the student user is making progress toward the completion of the Retention rounds.

Typically a student user would continue taking Retention rounds until the student user has met the Retention rounds' completion criteria. After the completion of the above-described rounds, the student user would typically take additional parts, sessions, or courses.

5.8 Training Methodology

As discussed in Section 5.5, the purpose of the Retention rounds is to help the student user lock-in material into the student user's long-term memory. Thus, the Retention rounds utilize repetition to efficiently train student users. However, the repetition that is emphasized is repetition by the student and not by a teacher. It has been found that a student is more likely to retain material if the student repetitively enters answer keyword(s) into a computer as opposed to hearing a teacher repetitively provide the answer. In addition, it has been found that requesting a student to enter complete answers takes significantly more training time than requesting the student to just enter the keywords of an answer.

It has also been found that students are more likely to retain material if the answer contains keywords of the question and well as keywords of the answer. For example, a student is likely to retain the answer to "Who was the first President of the United States?" if the student enters the underlined keywords in the following answer: "the first President of the United States was George Washington." On the other hand, a student it not likely to retain the name of the first President of the United States if the student enters the underlined keywords in the following answer: "George Washington." While entering such keywords may allow the student to retain the name of a United States President, it will not likely help the student retain the name of the first President of the United States.

A Lock-In Training session typically includes up to twenty-five questions. Similarly, a Lock-In Training part typically includes up to ten questions. However, the number of questions can vary above those values. As shown in FIG. 7, the session entitled "Presidents of the United States before the Civil War" includes sixteen questions. Thus, that session may include only one part of sixteen questions. However, that session could possibly contain two parts of eight questions each. Smaller numbers of questions are often appropriate if the material is more complex. Similarly, larger numbers of questions are often appropriate if the material is less complex. In some embodiments of the invention, a client administrator or a system administrator determines the number of questions in each part and then stores such information in a database, such as the database shown in FIG. 1B.

It has been found that student users can efficiently retain material when they enter answer keywords into a computer in spaced intervals. A student is less likely to retain material if the student enters keywords into a computer in rapid succession. However, if time intervals are inserted between the entering of keywords, then the student is more likely to retain the material. The time intervals need not be too small or too large. Thus, by selecting an appropriate number of questions in a part, the efficiency of training can be increased.

In other embodiments of the invention, intervening events are utilized to increase the time intervals between the entering of keywords. Examples of such intervening events can include: reading material; watching a movie; listening to audio; viewing an image; or attending to an event occurring between successive questions. As a result, some embodiments of the invention utilize intervening events between question answers. For example, after entering keywords to answer a first question, the user computer may display a short movie, output a short audio stream, and/or display one or more images to the user. In such embodiments, the student user may not be permitted to enter additional keywords until the movie and/or audio stream has terminated. Similarly, in some embodiments of the invention, the user may not be permitted to enter additional keywords until a predetermined period of time has elapsed, such as for example, 30 seconds or 1, 2, 3, 4, 5, 6, 7, 8, 9, or 10 minutes.

Because the time period between answering questions should not be too long, a Lock-In Training part that contains fifty questions is not likely to lead to long-term retention. The decreased retention results from the fact that the time period between the entering of keywords to a particular question is too long.

In addition to careful selection of the number of questions in each part, the training environment should be structured, if possible, to control the time intervals between questions. Recall that the time intervals need not be too large. If the training environment includes too many distractions, such as telephone calls, emails, pager pages, and/or conversations, then the efficiency of training may decrease.

One advantage of the Lock-In Training system is that no tests are required at the completion of training. It has been found that if a student user successfully completes a properly configured Lock-In Training course, as discussed in Section 5.9 below, then the student user will have learned the material in the course. Thus, there is no need to require the student user to take a separate test. By eliminating the testing requirements, student users are likely to be more relaxed and have increased long-term retention of the material.

Another advantage of the Lock-In Training system is that slow learners can take as much time as they need to take Lock-In Training courses. In addition, fast learners can spend only as much time as they need to take the courses. However, regardless of the time taken to complete the Lock-In Training courses, both the slow learner and the fast learner will have learned the course materials.

Still another advantage of the Lock-In Training system is that the system allows student users to efficiently relearn any materials that the student user may have forgotten after taking a Lock-In Training course. For example, if a student user has forgotten the $2^{nd}$ President of the United States, then the user could retake the Introductory round and/or the Retention rounds of a "Presidents of the United States" Lock-In Training course to rapidly relearn the $2^{nd}$ President. The time to retake a Lock-In Training course to relearn forgotten material is a fraction of the time that it takes to initially take the Lock-In Training course. Thus, the student user can rapidly relearn the needed material.

5.9 Training Days

Section 5.8 discussed how spaced repetition within a Lock-In Training session increases long-term retention of material. Long-term retention can be further increased by spaced repetition of sessions. For example, answering questions on a first day, then re-answering the same questions on second and third days has been found to increase long-term retention of the answers. Thus, as discussed in Section 5.6, some embodiments of the invention allow a client administrator or a system administrator to enter the number of training days that a student must complete in a Lock-In Training session or course. Thus, in order to compete a Lock-In Training course, a student user may be required to answer the same questions on 2, 3, 4, 5 or more days. In some embodiments of the invention, the days must be consecutive. However, in other embodiments of the invention, the days need not be consecutive. In such embodiments of the invention, consecutive training sessions may be required to be completed within a predetermined number of days, such as 2, 3, 4, 5, 6, 7, or more days, to count toward the completion of a Lock-In Training course.

In some embodiments of the invention, each training day is configured similarly. For example, if a client administrator enters information into a database that requires three identical training days, then student users may be required to take an Introductory round and successfully complete the Retention rounds on each of the three days. Similarly, a student user may only be required to successfully complete the Retention rounds on each of the three days.

In other embodiments of the invention, the training days are configured differently. For example, a student may be required to take an Introductory round and successfully complete the Retention rounds on the first training day. Then, on the second, third, and forth training days, the student user would only be required to successfully compete the Retention rounds.

By configuring the number of training days and the requirements of each training day, a client administrator or a system administrator can optimize the configuration of a Lock-In Training course.

5.10 Stand Alone Embodiments of the Invention

The above embodiments of the invention utilize a user computer 105 that is coupled to a Lock-In Training Web site 110 via a communications link such as the Internet or an Intranet. Such embodiments of the invention are particularly useful for corporate and government training in which the Lock-In Training courses are configured by client administrators and/or system administrators.

Another embodiment of the invention is a stand along computer system that allows a student user to take a Lock-In Training course without being coupled to another computer. One example of such a computer system is shown in FIG. 23. The computer system 2300 shown in FIG. 23 includes a computer 2310. Examples of such computers include personal computers currently manufactured by Dell Computer Corporation, International Business Machines, Hewlett-Packard Company, and Apple Computer Corporation.

The computer 2310 includes a conventional audio system 2320. The audio system 2320 is operable to convert a digital data stream into an analog electrical signal that can be output by a speaker, such as a computer speaker or a headphone. Because of the significant size of digital data streams, such streams are commonly compressed and stored in compressed audio streams. Such digital data streams, whether compressed or uncompressed and whether stored in memory or on a disk drive, will be referred to as "audio streams." The audio system 2320 also includes the ability to convert audio electrical signals from a microphone (not shown) into a digital data stream. This digital data stream can be processed by voice recognition software executing on computer 2310.

The computer 2310 is coupled to one or more input devices such as a mouse 2330 or a keyboard 2340. The computer 2310 may also use alternative input devices such as touch screens, touch pads, and/or microphones (not shown). The computer 2310 may also be coupled to a display device such as a computer monitor 2350. Other computer systems may not be coupled to a display device. For example, such a computer system may output information to a user via a speaker 2360 and/or a printer 2370.

The computer 2310 can also be coupled to one or more speakers 2360. The speakers 2360 may be stand-alone computer speakers such as are commonly utilized with desktop computer systems. Alternatively, the speakers 2360 may be integrated into the computer 2310 as is common with modem laptop computer systems. In addition, the speakers 2360 may be headphone speakers that are typically worn by a user. The speakers 2360 are operable to convert an electrical signal, which is output from the computer 2310, into audible tones.

The computer 2310 may also include a number of other subsystems that are typical in modern computers. For example, the computer 2310 may include a network device 2375, such as an Ethernet card or a modem, that is operable to transfer data to and from other computer systems and/or servers. In addition, the computer 2310 may include one or more program storage devices, such as Random Access Memory (RAM) 2380, a floppy disk drive 2385, a hard disk drive 2387, a CD disk drive 2390, and/or a DVD disk drive 2395. Additional program storage devices include flash memory (not shown), floppy disks (not shown), CDROM disks (not shown), and DVD disks (not shown). Each of the above program storage devices can be utilized to store computer programs, databases, audio streams, movies, and/or images. In some embodiments of the invention, the computer 2310 is running a Windows operating system, a Unix operating system, a Linux operating system, or an Apple operating system.

In some embodiments of the invention, one or more program storage devices store a computer program. The computer programs may be downloaded from other computer systems via network device 2375 or may be included in program storage devices, such as floppy disks, flash memory, CDROM disks, or DVD disks, that are inserted into the computer 2310.

The computer programs may include or reference one or more Lock-In Training courses, each of which may include a number of sessions, parts, questions, and answers. In addition, the computer programs may include or reference movies, audio streams, and/or images to ensure appropriate time intervals between question answers. The computer programs include computer instructions, that when executed by computer 2310, allow the user to take one or more Lock-In Training courses, each of which include one or more Introductory rounds and/or Retention rounds. Thus, the computer programs, when executed by the computer 2310 typically display computer screens, such as those shown in FIGS. 2 through 22 on the computer monitor 2350. The computer program may generate and/or display Web documents. Alternatively, the computer program may display windows that have similar functionality without using HTTP protocols. For example, the computer program may be a Microsoft Windows based C++ program that utilizes DirectX or OpenGL graphics routines to display text and graphics on computer monitor 2350.

The computer programs may also receive information from the user via the mouse 2330, the keyboard 2340, or another input device, such as microphone, number pad, or touch pad, and update computer screens in response to the received information. For example, if a user enters keywords via the keyboard 2340, then the computer program receives the keywords and updates computer screen displays in response to those keywords. As a result, the user can select and take Lock-In Training courses at the computer 2310 when the computer 2310 is not connected to any other computer.

In some embodiments of the invention, computer 2310 may store information related to the student user's training activities. Thus, the student user can utilize such information to confirm the student user's training activities. For example, after completing a Lock-In Training course, the student user may provide a file that contains some or all of the information stored in the "User Course," "User Sessions," and "User Part" tables of the database shown in FIG. 1B to the student user's teacher. Alternatively, computer 2310 may send such information to the teacher's computer or website via network device 2375. After reviewing the information, the teacher can confirm that the student user successfully completed the assigned Lock-In Training course(s).

The computer 2310 is not required to have a Web browser. However, if the computer 2310 does include a Web browser and a network device 2375, then the computer 2310 could replace the user computer 105 in the Lock-In Training system shown in FIG. 1A.

5.11 Other Embodiments of the Invention

In some embodiments of the invention, student users may be required to timely enter personal information to insure that the student, as opposed to another individual, is taking the Lock-In Training course. For example, the student user may be requested to enter the student user's birthday when taking an Introductory round. Similarly, the student user may be requested to enter the student user's mother's maiden name when taking a Retention round.

In still other embodiments of the invention, the computer program may utilize biometric identifiers during training to insure that the student, as opposed to another individual, is taking the Lock-In Training course. For example, a computer program could take a digital picture of the student user using a digital camera (not shown) when the student user is entering in keywords. Similarly, the student user could be requested to periodically place the student user's finger in a fingerprint reader. In addition, the digital images could be utilized to ensure that the student is not copying answers from another source of information in the Retention rounds.

5.12 Conclusion

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. For example, while the above description utilized questions and answers that included only words, the Lock-In Training system could be utilized with graphics, symbols, numbers, and/or sounds. For example, a question for an elementary school student could be to make the sound that corresponds to a graphic image of a cow. The student could then successfully answer the question by making a "mooing" sound into a microphone attached to a user computer. Similarly, the answer to a question could include words other than English words and/or symbols, such as "!," and "@." Additionally, the above disclosure is not intended to limit the present invention.

The above descriptions of embodiments of the present invention include words such as "first," "then," and "next." These words indicate a sequence of acts. Many of the sequences can be modified within the scope of the invention. Thus, unless the result of a first act is required for a second act, then the language indicating a sequence should not be considered to be a limitation to the invention. Similarly, the phrase "for example," is intended to be illustrative and not limiting.

Many of the numerous embodiments described above can be combined to form a very powerful training system. Such combinations are intended to be within the scope of the invention. For example, combining an Internet based Lock-In Training system with a standalone Lock-In Training system would provide a powerful training system.

While the invention has been described above with reference to certain preferred embodiments of the invention, these embodiments have been presented by way of example only, and are not to limit the scope of the invention. Accordingly the scope of the present invention is defined by the appended claims.

It is claimed:

1. A method comprising:
    reading data from a program storage device, the program storage device including a database that stores a number-of-training-days value and sequence data;
    utilizing the number-of-training-days value and the sequence data to control the sequence of at least one training event in a multi-day training course;
    wherein the at least one training event includes:
    (a) displaying, on a computer display, a complete answer to a question, the complete answer including a first word having m characters, followed by a second word, followed by a third word having n characters, where m and n are both greater than 1;
    (b) displaying, on the computer display, the question;
    (c) simultaneously displaying, on the computer display with the question, a partial answer to the question, the partial answer including the second word, the partial answer not including the first word or the third word, the partial answer including m locations for each of the m characters in the first word, the m locations positioned in the partial answer before the second word in the partial answer, the partial answer including n locations for each of the n characters in the third word, the n locations positioned in the partial answer after the second word in the partial answer; then
    (d) displaying in a first font the m characters of the first word at the m locations in the partial answer; then
    (e) receiving a first character from a user, the first character not being equal to the first character of the third word, the first character being equal to another character of the third word; then
    (f) not displaying in the first font any of the n characters of the third word in any of the n locations of the partial answer; then
    (g) receiving a second character from the user, the second character received from the user being equal to the first character of the third word; then
    (h) displaying in the first font the first character of the third word at the first of the n locations in the partial answer.

2. The method of claim 1, wherein the number-of-training-days value and the sequence data are stored in a single database table.

3. The method of claim 2, wherein the database table also stores data indicating the name of a client.

4. The method of claim 1, wherein the number-of-training-days value is specified by a client and the number-of-training-days value is not specified by the owner of the program storage device.

5. The method of claim 1, wherein the number-of-training-days value is not specified by the owner of the program storage device.

6. The method of claim 1, wherein the number-of-training-days value indicates the number of days of training that a student must take to complete the multi-day training course.

7. The method of claim 1, wherein the number-of-training-days value indicates the number of days of training that a student must take to complete a training session.

8. The method of claim 1, wherein the program storage device is remote from a user receiving training via the training event.

9. The method of claim 1, wherein the program storage device is not remote from a user receiving training via the training event.

10. The method of claim 1, wherein the method includes providing training over the Internet.

11. The method of claim 1, wherein the multi-day training course includes training session A and training session B, wherein each of the training sessions is taken over a plurality of days, and wherein the sequence data indicates that a user must complete the first day of training of session A and session B before taking the second day of training of either session A or session B.

12. The method of claim 1, wherein the multi-day training course includes training session A, training session B, and training session C, wherein each of the training sessions is taken over a plurality of days, and wherein the sequence data indicates (i) that a user must complete the first day of training of sessions A and B before taking the second day of training of either session A or session B and (ii) that the user can take the first day of training of session C before taking any days of training of either session A or session B.

13. The method of claim 1, wherein the multi-day training course includes training session A, training session B, and training session C, wherein each of the training sessions is taken over a plurality of days, and the sequence data indicates that the user can not take the second day of training of sessions A, B, or C, until the user has completed the first day of training of sessions A, B, and C.

14. The method of claim 1, wherein the multi-day training course includes training session A, training session B, and training session C, wherein each of the training sessions is taken over a plurality of days, and the sequence data indicates that the user can take all of the days of training of session A before taking any days of training of sessions B or C.

15. The method of claim 1, wherein the method includes providing training to a user via a graphical user interface and wherein the database includes data indicating whether a first client's graphical user interface is distinct from a second graphical interface.

16. The method of claim 1, wherein the method includes providing training to a user via a graphical user interface and wherein the database includes data that indicates the file name of a graphical image file that is utilized in a first client's graphical user interface but is not utilized in a second client's graphical user interface.

17. The method of claim 16, wherein the graphical image file contains a header graphical image.

18. The method of claim 16, wherein the graphical image file contains a footer graphical image.

19. The method of claim 16, wherein the graphical image file contains a background graphical image.

20. The method of claim 1, wherein the method includes providing training to users via a graphical user interface and wherein the database includes data that indicates (i) the file name of a graphical image file that is utilized in a first client's graphical user interface but is not utilized in a second graphical user interface (ii) a horizontal screen position utilized to position the graphical image defined by the graphical image file on the computer display and (iii) a vertical screen position utilized to position the graphical image defined by the graphical image file on the computer display.

21. The method of claim 1, wherein the method includes providing training to users via a graphical user interface and wherein the database includes data that indicates a custom color scheme that is utilized in a first client's graphical user interface but is not utilized in a second client's graphical user interface.

22. The method of claim 1, wherein the method includes providing training to users via a graphical user interface and wherein the database includes data that indicates a font that is utilized in a first client's graphical user interface but is not utilized in a second client's graphical user interface.

23. The method of claim 1, wherein the method includes providing training to users via a graphical user interface and wherein the database includes data that indicates a font size that is utilized in a first client's graphical user interface but is not utilized in a second client's graphical user interface.

24. The method of claim 1, wherein the method includes providing training to users via a graphical user interface and wherein the database includes data that indicates text that is utilized in a first client's graphical user interface but is not utilized in a second client's graphical user interface.

25. The method of claim 1, wherein the database includes LockoutPeriod data and the method includes providing training, based in part on the LockoutPeriod data.

26. The method of claim 25, further comprising calculating a period of time that begins at the time that a training session was completed.

27. The method of claim 25, further comprising calculating a period of time that begins at the time that a training session was begun.

* * * * *

UNITED STATES PATENT AND TRADEMARK OFFICE
CERTIFICATE OF CORRECTION

PATENT NO. : 7,390,191 B2  
APPLICATION NO. : 11/055186  
DATED : June 24, 2008  
INVENTOR(S) : Dennis R. Berman Page 1 of 1

It is certified that error appears in the above-identified patent and that said Letters Patent is hereby corrected as shown below:

On the Title Page Item (57)  
In Abstract (at first paragraph):  
  Replace "number-of training-days" with --number-of-training-days--.

On the Title Page Item (57)  
In Abstract (at first paragraph):  
  Replace "when executed by the computer system." with --when executed by the computer system,--.

In Claim 1 (at column 26, line 34):  
  Replace "nare" with --n are--.

Signed and Sealed this

Twenty-fourth Day of March, 2009

JOHN DOLL  
*Acting Director of the United States Patent and Trademark Office*